(12) United States Patent
Nawata

(10) Patent No.: US 12,455,546 B2
(45) Date of Patent: Oct. 28, 2025

(54) RECORDING MEDIUM AND PROGRAMMING SUPPORT APPARATUS

(71) Applicant: Mitsubishi Electric Corporation, Tokyo (JP)

(72) Inventor: Shinya Nawata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 13 days.

(21) Appl. No.: 18/704,086

(22) PCT Filed: Jan. 14, 2022

(86) PCT No.: PCT/JP2022/001083
§ 371 (c)(1),
(2) Date: Apr. 24, 2024

(87) PCT Pub. No.: WO2023/135735
PCT Pub. Date: Jul. 20, 2023

(65) Prior Publication Data
US 2024/0329615 A1    Oct. 3, 2024

(51) Int. Cl.
G05B 19/042    (2006.01)
(52) U.S. Cl.
CPC ............ *G05B 19/0426* (2013.01); *G05B 2219/13101* (2013.01)
(58) Field of Classification Search
CPC .............. G05B 19/0426; G05B 2219/13101
See application file for complete search history.

(56) References Cited

U.S. PATENT DOCUMENTS 6,633,888 B1 * 10/2003 Kobayashi ............... G06F 8/34
707/999.102
8,321,847 B1 * 11/2012 Garvin ..................... G06F 8/41
717/116
(Continued)

FOREIGN PATENT DOCUMENTS

JP    H11-237984 A    8/1999
JP    2005-353092 A   12/2005
(Continued)

OTHER PUBLICATIONS

International Search Report and Written Opinion mailed on Apr. 5, 2022, received for PCT Application PCT/JP2022/001083, filed on Jan. 14, 2022, 9 pages including English Translation.
(Continued)

*Primary Examiner* — Thomas C Lee
*Assistant Examiner* — Tyler Dean Hedrick
(74) *Attorney, Agent, or Firm* — XSENSUS LLP

(57) ABSTRACT

A program causes a programming support apparatus that provides support for generation of an operational program for operating a programmable controller to function as an acquirer for acquiring a first source code of the operational program, and a generator. The generator generates a second source code of the operational program by replacing a conventional FB that is described in the first source code and describes a function of a function block corresponding to a subroutine in a form different from one or more methods contained in the function block, with an object-oriented FB describing the function as one or more methods, or replacing a description relating to an instance declared on the basis of the conventional FB in the first source code, with a description relating to an instance declared on the basis of the object-oriented FB.

21 Claims, 17 Drawing Sheets

(56) References Cited

U.S. PATENT DOCUMENTS

| | | | |
|---|---|---|---|
| 9,460,417 B2* | 10/2016 | Strassner | G06Q 10/06 |
| 2009/0007000 A1 | 1/2009 | Hasegawa et al. | |
| 2009/0138894 A1* | 5/2009 | Schneider | G06F 9/449 |
| | | | 719/315 |
| 2013/0061205 A1* | 3/2013 | Bohm | G06F 8/315 |
| | | | 717/108 |
| 2019/0050209 A1* | 2/2019 | Pandey | G06F 8/71 |
| 2023/0126532 A1* | 4/2023 | Feldman | G06F 9/5077 |
| | | | 711/154 |

FOREIGN PATENT DOCUMENTS

| | | |
|---|---|---|
| JP | 2009-009462 A | 1/2009 |
| JP | 2014-191738 A | 10/2014 |

OTHER PUBLICATIONS

Miyazawa et al., "Trends in PLC Programming Language Standards and its Future of Related Software Technology", The Papers of Technical meeting of the Institute of Electrical Engineers of Japan, Mar. 1, 2013, 8 pages.

Decision to Grant mailed on Jul. 19, 2022, received for JP Application No. 2022-535791, 5 pages including English Translation.

* cited by examiner

FIG.11

```
ProgPou
    // Variable declaration
        unit_A_information            : unit_structure            ← 411
        unit_B_information            : unit_structure            ← 414
        set_alignment_data_in_unit_B  : set_alignment_data        ← 415
        start_alignment_operation_in_unit_B : start_alignment_operation ← 416
        unit_A                        : alignment_unit            ← 417

// Logical description    ─ 419
        // Unit A
        unit_A.unit_information := unit_A_information            ← 4191
        unit_A.method_for_data_setting (data_No := 1)            ← 4194
        unit_A.unit_information := unit_A_information            ← 4192
        unit_A.method_for_operation_start (start_No := 1)        ← 4193
        // Unit B
        set_alignment_data_in_unit_B.unit_information := unit_A_information
        set_alignment_data_in_unit_B (alignment_data_No := 2)
        start_alignment_operation_in_unit_B (unit_information := unit_A_information,
                                             start_No := 2)
```

42

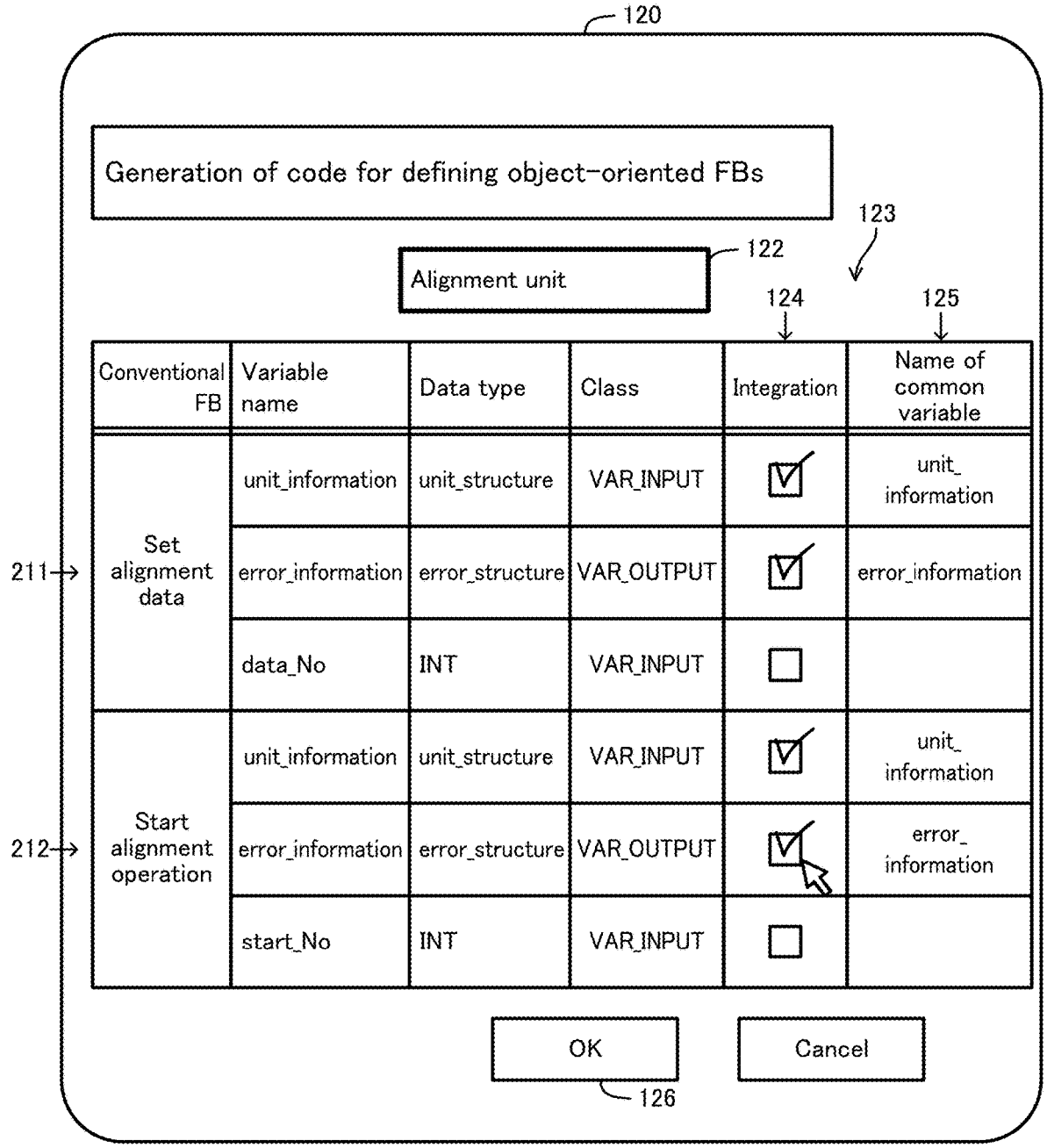

RECORDING MEDIUM AND PROGRAMMING SUPPORT APPARATUS

CROSS-REFERENCE TO RELATED APPLICATION

This application is a national stage application, pursuant to 35 U.S.C. § 371, of International Patent Application No. PCT/JP2022/001083, filed Jan. 14, 2022, the entire contents of which are incorporated herein by reference.

TECHNICAL FIELD

The present disclosure relates to a programming support program, a programming support method, and a programming support apparatus.

BACKGROUND ART

Programmable controllers are widely used in the fields of FA. In order to cause such a programmable controller to execute a certain control process, an operational program prescribing the details of this control process needs to be generated and executed by the programmable controller. Such an operational program can be revised by recently proposed techniques for introducing object-oriented programming to the operational program (for example, refer to Patent Literature 1). Patent Literature 1 discloses a technique for converting the functions of a process control system into objects, each of which encapsulates methods and data.

The operational program is generated using a programming language, a typical example of the known standards of which is IEC 61131-3. The third edition of the IEC 61131-3 is based on object-oriented programming, and directed to object-oriented function blocks, which are extended from conventional function blocks corresponding to the subroutines prescribed in the second edition.

CITATION LIST

Patent Literature

Patent Literature 1: Unexamined Japanese Patent Application Publication No. 2005-353092

SUMMARY OF INVENTION

Technical Problem

The transition to object-oriented programming urges a user owning software assets containing descriptions of conventional function blocks to learn new language specifications and accept an increase in the amount of complicated tasks of correcting the program on the basis of the differences between the language specifications. Such complicated tasks may result in an error in the operational program, leading to an unintended operation of the programmable controller. Required is a reduction in the burden on the user who generates the operational program for the programmable controller, in order to achieve proper operations of the programmable controller.

An objective of the present disclosure, which has been accomplished in view of the above situations, is to reduce the burden of generating operational programs for programmable controllers.

Solution to Problem

In order to achieve the above objective, a programming support program according to the present disclosure, for a computer that provides support for generation of an operational program for operating a programmable controller, causes the computer to function as: acquisition means for acquiring a first source code of the operational program; and generation means for generating a second source code of the operational program by replacing a first function block contained in the first source code with a second function block, or replacing a description relating to a first instance declared based on the first function block in the first source code, with a description relating to a second instance declared based on the second function block. The first function block and the second function block describe a function of a function block corresponding to a subroutine. The first function block describes the function in a form different from one or more methods contained in the function block. The second function block describes the function as the one or more methods.

Advantageous Effects of Invention

The present disclosure can reduce the burden on the user who generates operational programs for programmable controllers.

BRIEF DESCRIPTION OF DRAWINGS

FIG. 11 illustrates an exemplary second source code according to Embodiment 2;

FIG. 17 illustrates an exemplary screen for determination of a common variable according to a modification.

DESCRIPTION OF EMBODIMENTS

A programming support apparatus according to embodiments of the present disclosure is described in detail below with reference to the accompanying drawings. This programming support apparatus converts a non-object-oriented source code into an object-oriented source code, and thus provides support for generation of operational programs for programmable controllers.

Embodiment 1

Figure 1:
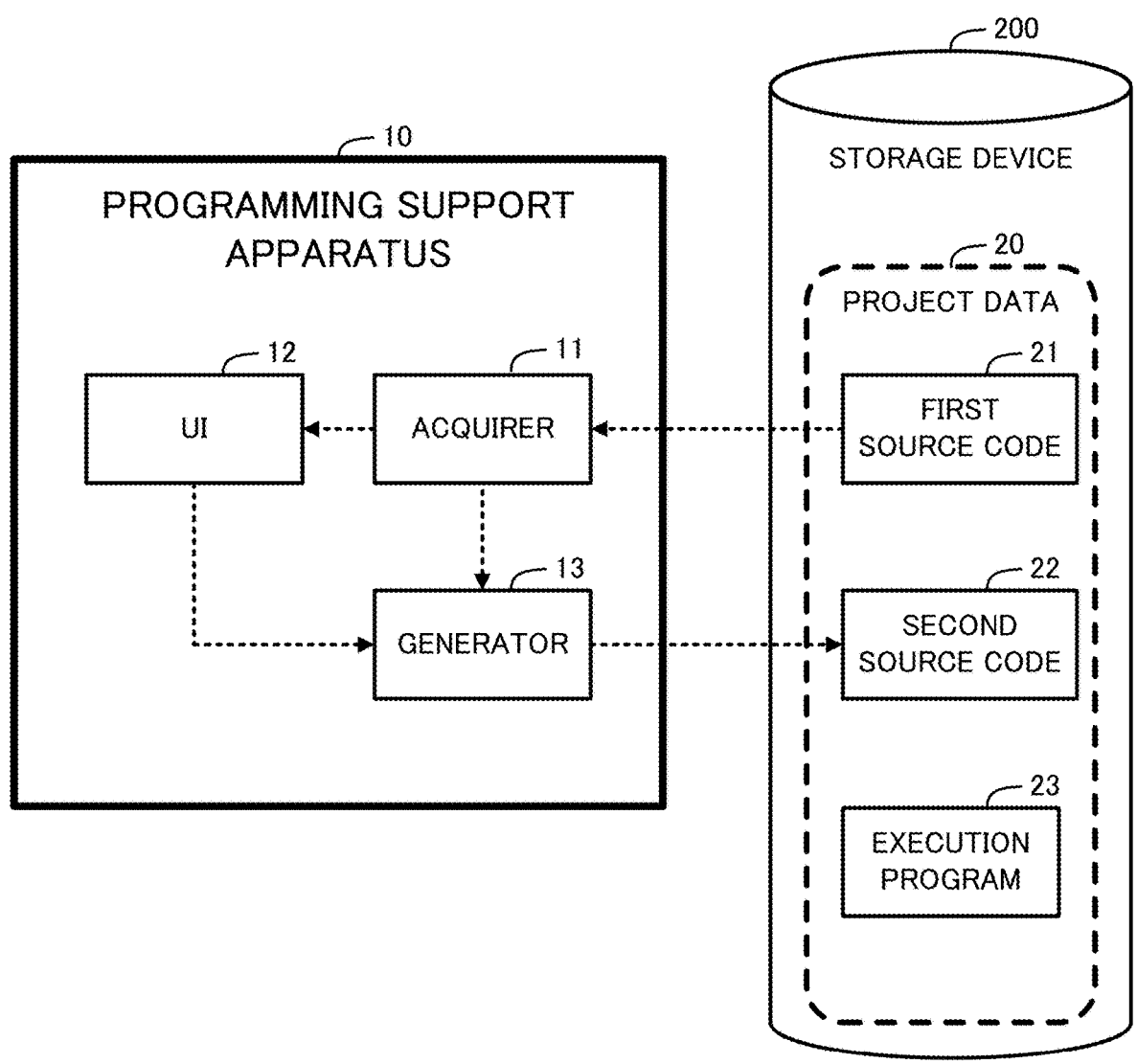
FIG. 1 illustrates a functional configuration of a programming support apparatus according to Embodiment 1.

A programming support apparatus 10 according to this embodiment is an industrial personal computer (PC) or a server device on a network capable of executing software serving as an engineering tool for editing source codes. As illustrated in FIG. 1, the programming support apparatus 10 reads a first source code 21 from project data 20 stored in a storage device 200, generates a second source code 22 on the basis of the read first source code 21, and then writes the generated second source code 22 into the project data 20.

The storage device 200 may be a memory card attachable to and detachable from the programming support apparatus 10, or may be a device connected to the programming support apparatus 10 via a network. Although the storage device 200 resides outside the programming support apparatus 10 in FIG. 1, the storage device 200 may also be included in the programming support apparatus 10.

The project data 20 is a collection of data to be used by a programmable controller. The project data 20 contains one or more operational programs for operating the programmable controller. The operational programs contain object files to be directly executed by the programmable controller, and various source codes to be compiled into these object files. The operational programs contain a single program to be first executed by the programmable controller, and external programs and library data to be referred to as required.

The operational programs of the project data 20 include the first source code 21, the second source code 22, and an execution program 23. The first source code 21 and the execution program 23 are generated by the user with the engineering tool.

The first source code 21 contains the definitions of function blocks, which correspond to non-object-oriented subroutines. The function blocks are each one or more reusable instructions to perform predetermined functions when called by another program. The function blocks defined in the first source code 21 may be the function blocks prescribed in the second edition of the IEC 61131-3, or the functions prescribed in the IEC 61131-3 standard, or other programming language elements corresponding to subroutines. In some contexts of the following description, the function block is referred to as "FB" as appropriate, and the IEC 61131-3 standard is abbreviated as "IEC standard". The non-object-oriented FB is referred to as "conventional FB" as appropriate. The FBs contained in the first source code 21 are conventional FBs.

The second source code 22 contains the definitions of object-oriented FBs. In detail, the second source code 22 describes the definitions of object-oriented FBs containing methods. The methods are similar to conventional FBs because each of them are one or more reusable instructions to perform predetermined functions when called by another program. The methods, however, differ from conventional FBs in that the methods are called as member functions of declared instances of object-oriented FBs. The object-oriented FBs can each contain multiple methods corresponding to functions, whereas the conventional FBs each correspond to a single integrated function. The object-oriented FBs defined in the second source code 22 may be the function blocks prescribed in the third edition of the IEC standard, or the classes defined in the third edition, or other programming language elements containing methods.

The conventional FB corresponds to an example of a first function block that describes a function of a function block corresponding to a subroutine in a form different from one or more methods contained in the function block. The object-oriented FB corresponds to an example of a second function block that describes the function as one or more methods.

The execution program 23 is an operational program based on instances of the conventional FBs defined in the first source code 21. The first source code 21, the second source code 22, and the execution program 23 may be written in a programming language, examples of which include the instruction list, structured text, ladder diagram, function block diagram, and sequential function chart prescribed in the IEC standard, and other languages.

Figure 2:
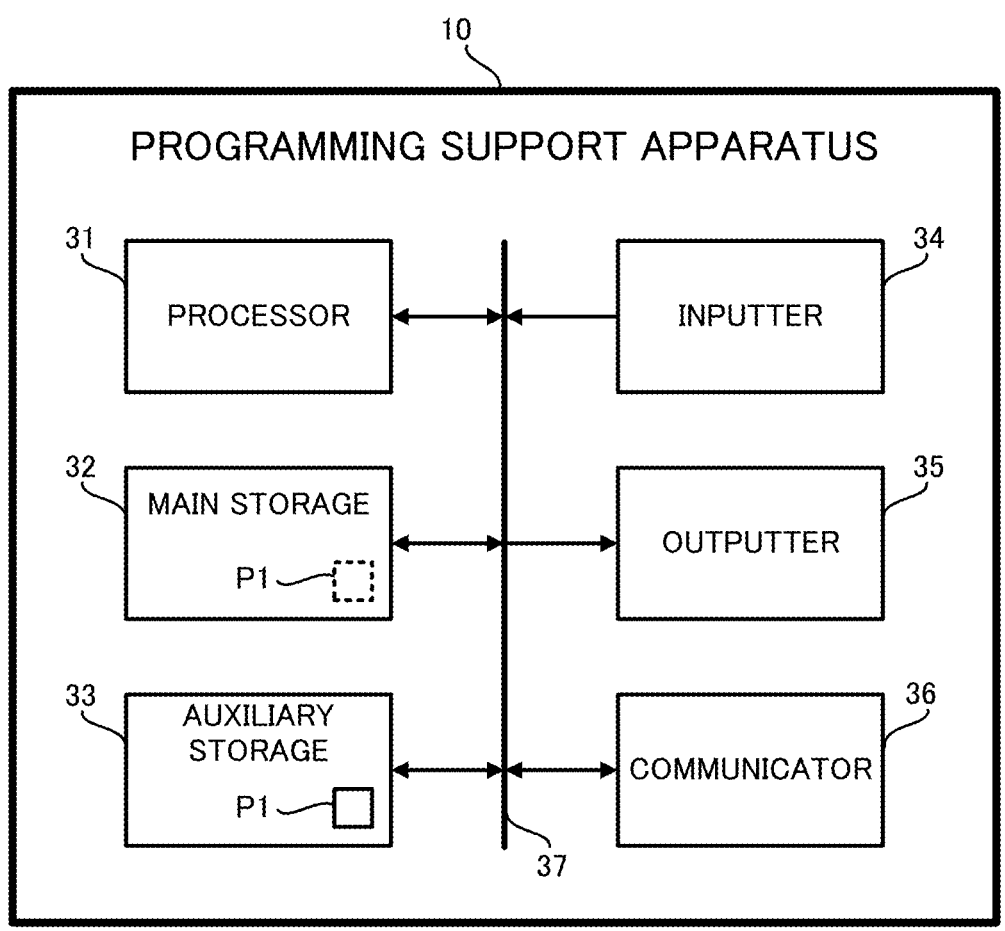
FIG. 2 illustrates a hardware configuration of the programming support apparatus according to Embodiment 1.

The programming support apparatus 10 is a computer to execute an engineering tool for generating the second source code 22 from the first source code 21. In detail, the programming support apparatus 10 has hardware components including a processor 31, a main storage 32, an auxiliary storage 33, an inputter 34, an outputter 35, and a communicator 36, as illustrated in FIG. 2. The main storage 32, the auxiliary storage 33, the inputter 34, the outputter 35, and the communicator 36 are each connected to the processor 31 via internal buses 37.

The processor 31 includes a central processing unit (CPU), which is a processing circuit. The processor 31 executes a program P1 stored in the auxiliary storage 33 and thus performs various functions of the programming support apparatus 10 and executes processes described below.

The main storage 32 includes a random access memory (RAM). The main storage 32 receives the program P1 loaded from the auxiliary storage 33. The main storage 32 serves as a work area of the processor 31. The program P1 corresponds to the engineering tool, and corresponds to an example of a programming support program for generating the second source code 22. The program P1 illustrated as a representative in FIG. 2 may be replaced with multiple programs P1.

The auxiliary storage 33 includes a non-volatile memory represented by an electrically erasable programmable read-only memory (EEPROM) or hard disk drive (HDD). The auxiliary storage 33 stores the program P1 and various types of data to be used in processes in the processor 31. The auxiliary storage 33 provides the processor 31 with data to be used by the processor 31, and stores data fed from the processor 31, under the instructions from the processor 31.

The inputter 34 includes an input device represented by a keyboard or a pointing device. The inputter 34 acquires information input by the user of the programming support apparatus 10 and outputs the acquired information to the processor 31.

The outputter 35 includes an output device represented by a liquid crystal display (LCD) or speaker. The outputter 35 presents various types of information to the user under the instructions from the processor 31.

The communicator 36 includes a network interface circuit to communicate with external apparatuses. The communicator 36 receives signals from an external apparatus and outputs information indicated by the signals to the processor 31. The communicator 36 also transmits signals indicating the information output from the processor 31 to an external apparatus.

The inputter 34 and the outputter 35 correspond to the user interface (UI) of the programming support apparatus 10. Alternatively, the programming support apparatus 10 may be connected to an external UI device via the communicator 36 to acquire and provide information from and to the user via the communicator 36. In an exemplary case where the programming support apparatus 10 has a UI achieved by the communicator 36 in cooperation with the external UI device instead of the inputter 34 and the outputter 35, the programming support apparatus 10 may exclude the inputter 34 and the outputter 35. In another exemplary case where the programming support apparatus 10 is a stand-alone apparatus that never communicates with external apparatuses, the programming support apparatus 10 may exclude the communicator 36.

Referring back to FIG. 1, the programming support apparatus 10 has functional components achieved by cooperation of the above-described hardware components. In detail, the programming support apparatus 10 includes an acquirer 11 to acquire a first source code 21, a UI 12, and a generator 13 to generate a second source code 22 on the basis of data input by the user.

The acquirer 11 is mainly achieved by the processor 31. In the case where the acquirer 11 acquires the first source code 21 through communication with the storage device 200, the acquirer 11 is achieved by cooperation of the processor 31 and the communicator 36. The acquirer 11 reads the project data 20 from the area of the storage device 200 at the address designated by the user and acquires the first source code 21. The acquirer 11 then outputs the read project data 20 to the UI 12, and outputs the first source code 21 to the generator 13. The acquirer 11 corresponds to an example of acquisition means, in the programming support apparatus 10, for acquiring a first source code of the operational program.

The UI 12 may be mainly achieved by cooperation of the inputter 34 and the outputter 35, or achieved by the communicator 36 in cooperation with the external UI device as described above. The UI 12 displays a configuration of the project data 20, and receives, from the user, a selection of conventional FBs required to be replaced with methods of object-oriented FBs.

Figure 3:
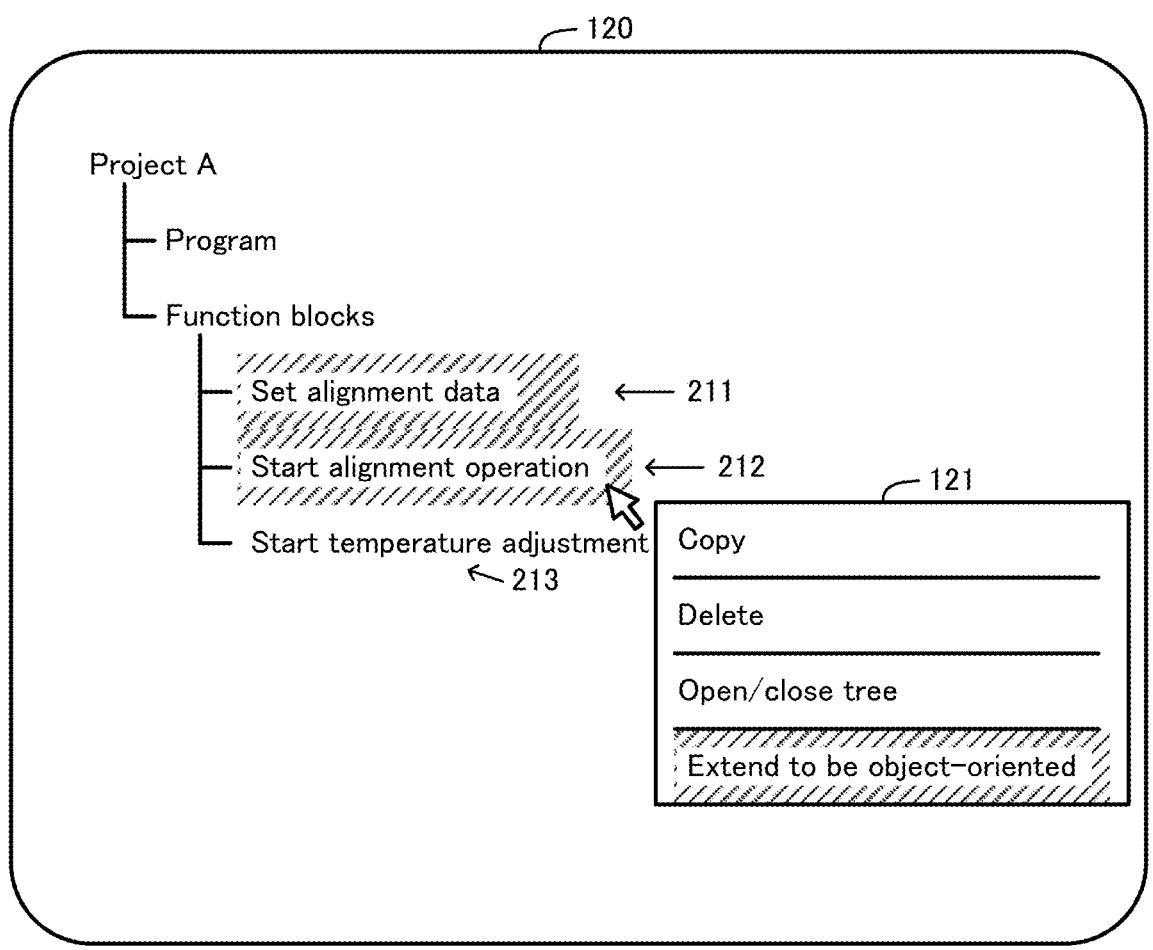
FIG. 3 illustrates an exemplary screen for selection of conventional function blocks according to Embodiment 1.

FIG. 3 illustrates an exemplary screen 120 of the UI 12 that displays a list of function blocks included in a "project A". The list of function blocks contains a conventional FB 211 indicating "set alignment data", a conventional FB 212 indicating "start alignment operation", and a conventional FB 213 indicating "start temperature adjustment". One or more conventional FBs are selectable from this list. The conventional FBs 211 and 212 selected by the user are highlighted by hatching in FIG. 3.

In response to the selection of the conventional FBs 211 and 212, the UI 12 displays a submenu 121 containing a list of operations related to the selected conventional FBs 211 and 212. When an operation to "extend to be object-oriented" is selected in the submenu 121, the UI 12 receives the selection of the conventional FBs 211 and 212 required to be replaced with object-oriented FBs. The UI 12 corresponds to an example of reception means, in the programming support apparatus 10, for receiving a selection of a first function block among function blocks contained in the first source code.

Figure 4:
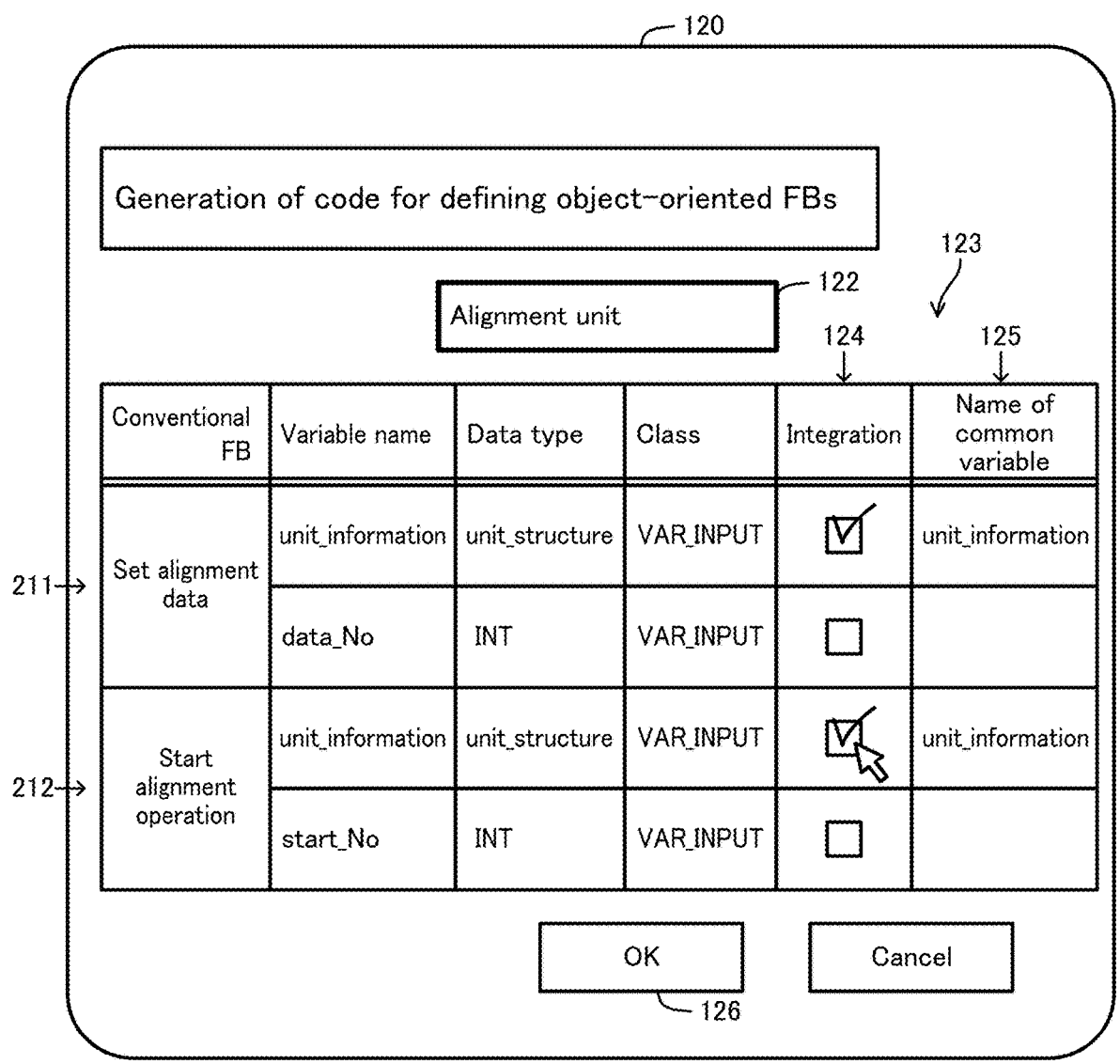
FIG. 4 illustrates an exemplary screen for determination of a common variable according to Embodiment 1.

The UI 12 then receives a selection of variables required to be integrated into a common member variable of object-oriented FBs, from among the variables of the selected conventional FBs. FIG. 4 illustrates an exemplary screen 120 that displays an entry field 122 to be filled with the name of a currently generated object-oriented FB, and a table 123 illustrating the variables contained in the conventional FBs.

Figure 5:
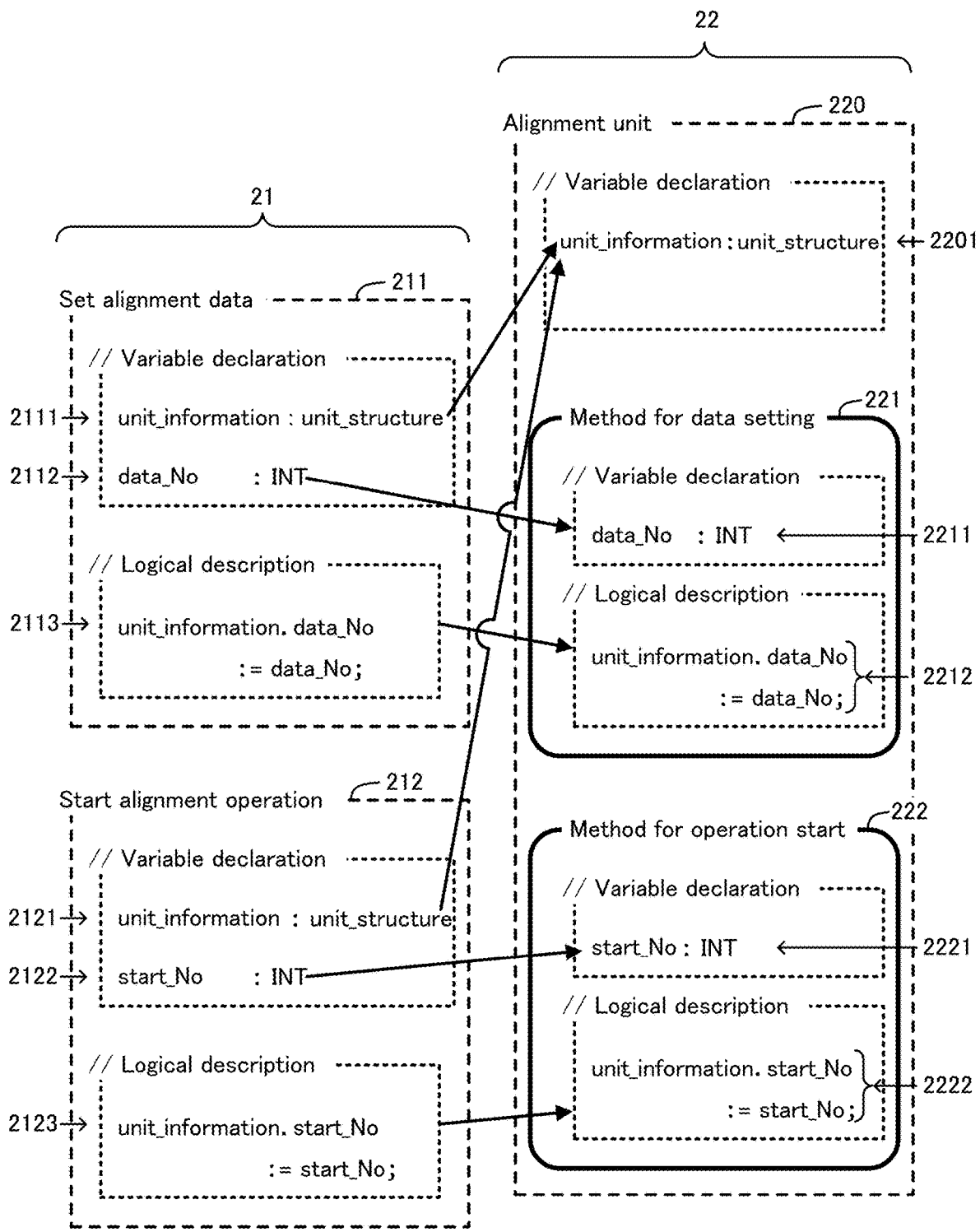
FIG. 5 illustrates a comparison between a first source code and a second source code according to Embodiment 1.

As illustrated in the left part of FIG. 5, the conventional FB 211 contains declarations of a variable 2111 indicating "unit_information" and a variable 2112 indicating "data_No", whereas the conventional FB 212 contains declarations of a variable 2121 indicating "unit_information" and a variable 2122 indicating "start_No".

The table 123 in FIG. 4 contains a list of these variables 2111, 2112, 2121, and 2122. The table 123 also contains a checkbox column 124 used to select variables to be integrated into a common variable. The user selects variables by checking the corresponding checkboxes, and then provides a column 125 with the name of the common variable to be generated by integration in the object-oriented FB. The variables 2111 and 2121 indicating "unit_information" of the respective conventional FBs 211 and 212 are substantially the same in the example illustrated in FIG. 4, and are thus integrated into a common variable named "unit_information" in the currently generated object-oriented FB named "alignment unit". In contrast, the variable 2112 indicating "data_No" and the variable 2122 indicating "start_No" are mutually different and peculiar to the respective conventional FBs 211 and 212, and are thus not determined as a common variable. Pressing a button 126 by the user completes the selection of conventional FBs and the determination of a common variable.

Referring back to FIG. 1, the generator 13 is mainly achieved by the processor 31. The generator 13 generates a second source code 22 from the first source code 21, on the basis of the selection and the determination provided by the user through the UI 12.

In detail, as illustrated in the right part of FIG. 5, the currently generated object-oriented FB 220 contains a method 221 associated with the conventional FB 211, and a method 222 associated with the conventional FB 212. The function of the method 221 is defined by a logical description 2212, which has the same content as a logical description 2113 of the associated conventional FB 211. The function of the method 222 is defined by a logical description 2222, which has the same content as a logical description 2123 of the associated conventional FB 212.

The object-oriented FB 220 also contains a declaration of a common variable 2201 generated by integrating the variables 2111 and 2121 of the conventional FBs 211 and 212. The method 221 contains a declaration of a variable 2211, which corresponds to the variable 2112 not determined as a common variable among the variables 2111 and 2112 of the associated conventional FB 211. The method 222 contains a declaration of a variable 2221, which corresponds to the variable 2122 not determined as a common variable among the variables 2121 and 2122 of the associated conventional FB 212.

The generator 13 then outputs the generated second source code 22 to the storage device 200. The generator 13 corresponds to an example of generation means, in the programming support apparatus 10, for generating a second source code of an operational program for operating a programmable controller by replacing a first function block described in the first source code with a second function block.

Figure 6:
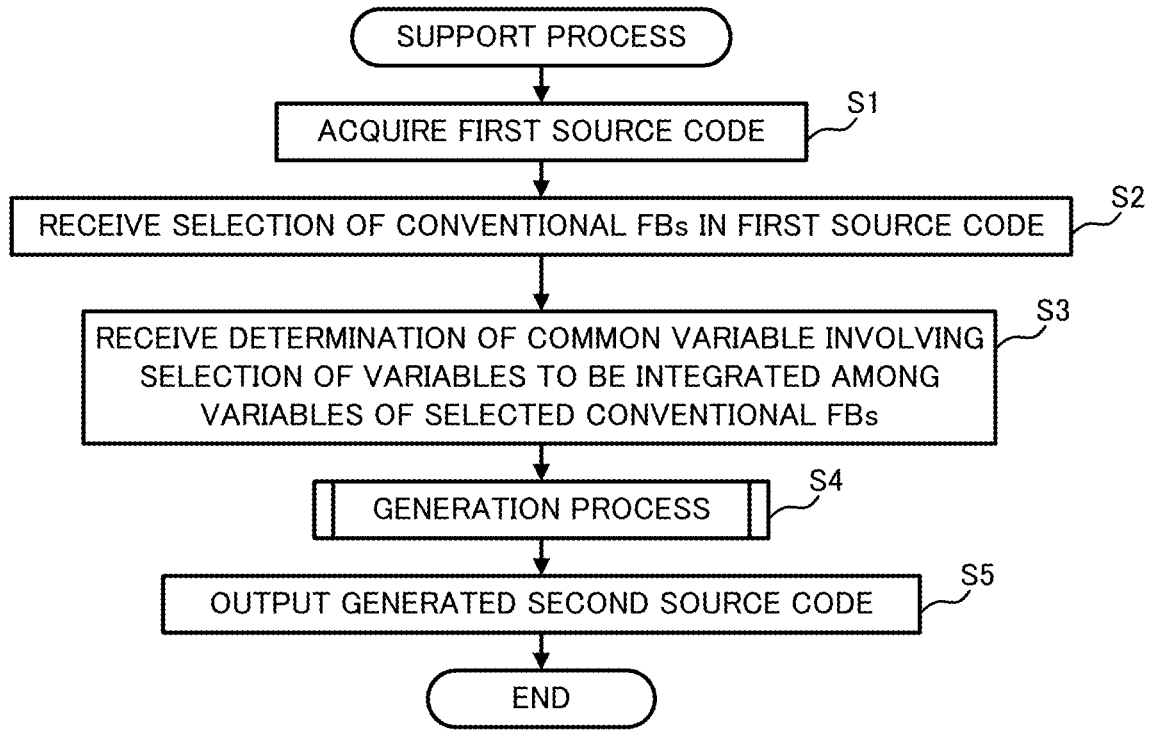
FIG. 6 is a flowchart illustrating a support process according to Embodiment 1.
Figure 7:
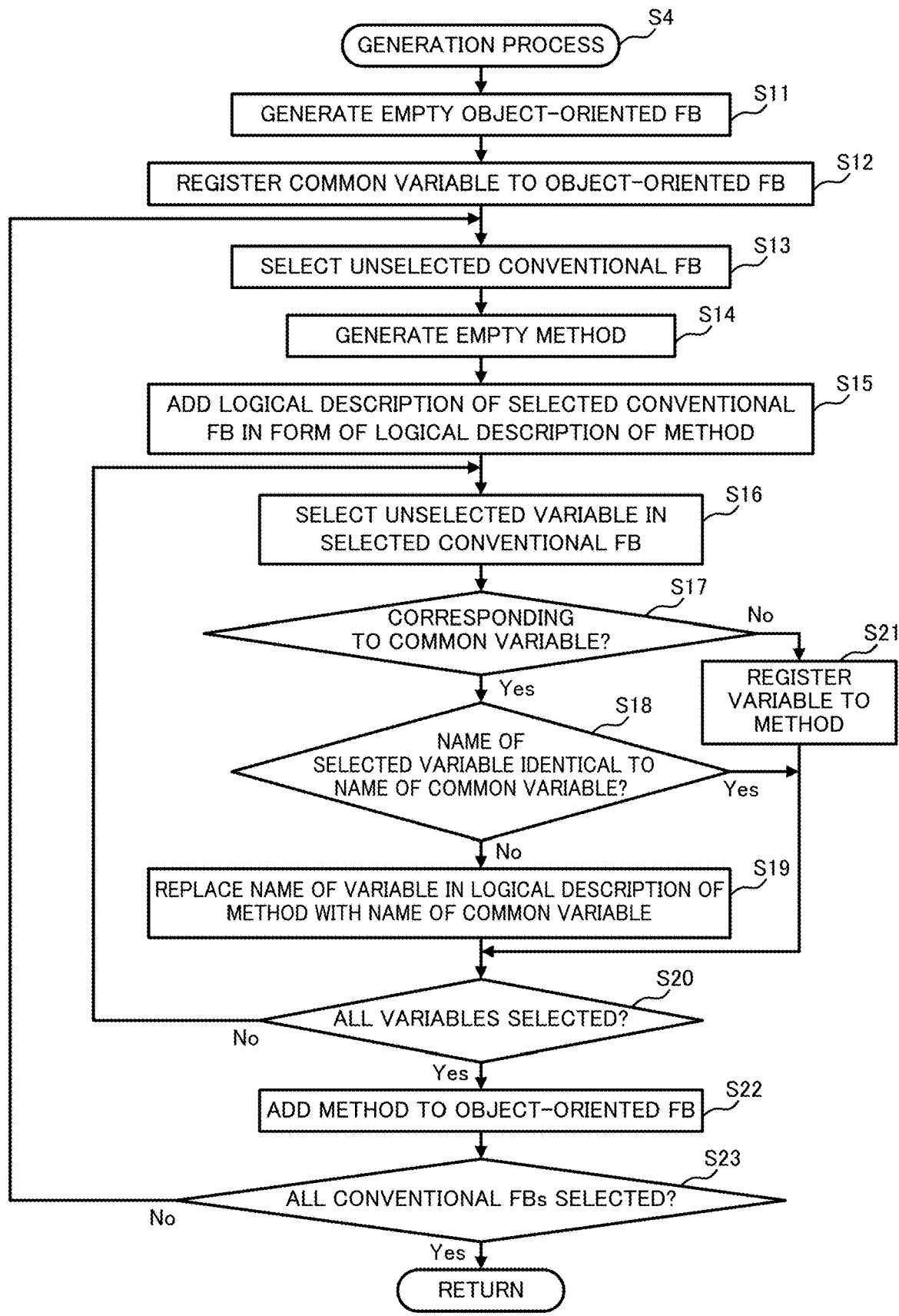
FIG. 7 is a flowchart illustrating a generation process according to Embodiment 1.

The following describes a support process executed by the programming support apparatus 10 with reference to FIGS. 6 and 7. This support process is initiated by a certain manipulation of the user. The support process corresponds to an example of a programming support method of providing support for generation of an operational program.

In the support process illustrated in FIG. 6, the acquirer 11 of the programming support apparatus 10 acquires a first source code 21 (Step S1). The UI 12 receives a selection of conventional FBs of the first source code 21 acquired in Step S1 (Step S2), and then receives a selection of variables to be integrated into a common variable among the variables of the conventional FBs selected in Step S2 (Step S3).

On the basis of the selections received in Steps S2 and S3, the generator 13 then executes a generation process for generating the second source code 22 from the first source code 21 acquired in Step S1 (Step S4). After completion of the generation process, the generator 13 outputs the generated second source code 22 (Step S5). The support process is then terminated.

FIG. 7 illustrates the details of the generation process in Step S4. In the generation process illustrated in FIG. 7, the generator 13 generates an empty object-oriented FB (Step S11), and registers the common variable determined in Step S3 to the generated empty object-oriented FB (Step S12). This step adds a description of a declaration of the common variable 2201 to the object-oriented FB in the example illustrated in FIG. 5.

The generator 13 then selects a conventional FB that has not been selected in the generation process, from among the conventional FBs selected in Step S2 (Step S13). For example, the generator 13 selects the conventional FB 211 illustrated in FIG. 5.

The generator 13 then generates an empty method (Step S14), and adds a logical description of the conventional FB selected in Step S13, in the form of a logical description of the empty method generated in Step S14 (Step S15). This step adds the logical description 2212 of the method 221 in the example illustrated in FIG. 5.

The generator 13 then selects a variable that has not been selected in the generation process, from among the variables contained in the conventional FB selected in Step S13 (Step S16). For example, the generator selects the variable 2111 of the conventional FB 211 illustrated in FIG. 5.

The generator 13 then determines whether the variable selected in Step S16 corresponds to the common variable determined in Step S3 (Step S17). When determining that the selected variable corresponds to the common variable (Step S17; Yes), the generator 13 determines whether the name of the variable selected in Step S16 is identical to the name of the common variable (Step S18).

When determining that the names are identical to each other (Step S18; Yes), the generator 13 proceeds to Step S20. In contrast, when determining that the names are not identical to each other (Step S18; No), the generator 13 replaces the name of the variable selected in Step S16 in the logical description of the method, with the name of the corresponding common variable (Step S19). This step corrects the description relating to the variable added in Step S15 into a description relating to the common variable. The description relating to the variable may be a description for accessing the variable, or another description containing the variable.

The generator 13 then determines whether all the variables of the conventional FB selected in Step S13 have been selected (Step S20). When determining that not all the variables have been selected (Step S20; No), the generator 13 repeats Step S16 and the following steps. For example, the generator 13 selects the variable 2112 of the conventional FB 211 illustrated in FIG. 5, and executes Step S16 and the following steps for the variable 2112.

In Step S17, when the generator 13 determines that the variable does not correspond to the common variable (Step S17; No), the generator 13 registers the variable selected in Step S16 to the method generated in Step S14 (Step S21). This step adds a description relating to the variable 2211 to the method 221 illustrated in FIG. 5, for example.

In Step S20, when the generator 13 determines that all the variables have been selected (Step S20; Yes), the generator 13 adds the method generated in Steps S14 to S20 to the object-oriented FB (Step S22). This step adds the method 221 illustrated in FIG. 5 to the object-oriented FB 220, for example.

The generator 13 then determines whether all the conventional FBs selected in Step S2 have been selected in the generation process (Step S23). When determining that not all the conventional FBs have been selected (Step S23; No), the generator 13 repeats Step S13 and the following steps. These steps add the method 222 illustrated in FIG. 5 to the object-oriented FB 220, for example. In contrast, when the generator 13 determines that all the conventional FBs have been selected (Step S23; Yes), the generator 13 generates a second source code 22 prescribing the object-oriented FB 220, and the process executed by the programming support apparatus 10 returns from the generation process to the support process illustrated in FIG. 6.

As described above, the programming support apparatus 10 according to this embodiment replaces conventional non-object-oriented FBs contained in the first source code 21 with methods of object-oriented FBs, and can thus obtain a second source code 22 containing these object-oriented FBs. The programming support apparatus 10 can therefore reduce the burden on the user who generates operational programs for programmable controllers, and promote transition to object-oriented programming.

A typical programmable controller includes multiple units. In order to achieve the functions of these units by means of conventional FBs, the execution program 23 requires describing different declarations of instances for the respective functions of the units and setting of redundant information on the units, even if the programmable controller uses only one of the units. The execution program 23 is thus inevitably complicated.

In contrast, the programming support apparatus 10 according to this embodiment replaces conventional FBs with functions of a single object-oriented FB. The execution program 23 thus does not require setting of common data in response to every calling of a method, and can achieve a simpler first source code 21.

The UI 12 corresponds to an example of reception means for receiving a selection of first function blocks contained in the first source code as optional elements. The generator 13 corresponds to an example of generation means for generating the second source code by replacing the first function blocks selected from the first source code with a second function block containing methods corresponding to the first function blocks. The generator 13 also corresponds to an example of generation means for replacing the first function blocks with the second function block containing a common variable corresponding to different variables that are each contained in a corresponding first function block of the first function blocks.

Although the user manually sets the name of a generated object-oriented FB, and the name of a common variable in the example illustrated in FIG. 4, this configuration is a mere example. The name of the object-oriented FB and the name of the common variable may also be determined by the programming support apparatus 10 in accordance with predetermined naming rules.

Although the name of a method of an object-oriented FB is determined by the programming support apparatus 10 so as to be similar to the name of the corresponding conventional FB in the above-described example, the name of the method may be identical to the name of the conventional FB or may be set by the user.

The variables of the conventional FBs to be associated with a common variable are determined by the user through the UI 12 in the above-described example, this configuration is a mere example. For example, the generator 13 may analyze the execution program 23 and determine the input variables or output variables of the conventional FBs connected to the same data to be a common variable, instead of the determination through the UI 12. In the case where the selection of a common variable and the setting of the name of the object-oriented FB are performed by not the user but the programming support apparatus 10, the UI 12 does not display the dialog screen illustrated in FIG. 4.

Embodiment 2

The following describes Embodiment 2 focusing on the differences from Embodiment 1 described above. The components identical or corresponding to those in Embodiment 1 are provided with the same reference symbols, without redundant description or with simplified description. This embodiment differs from Embodiment 1 in that descriptions relating to instances declared on the basis of FBs are replaced with each other instead of replacement of descriptions for defining FBs.

Figure 8:
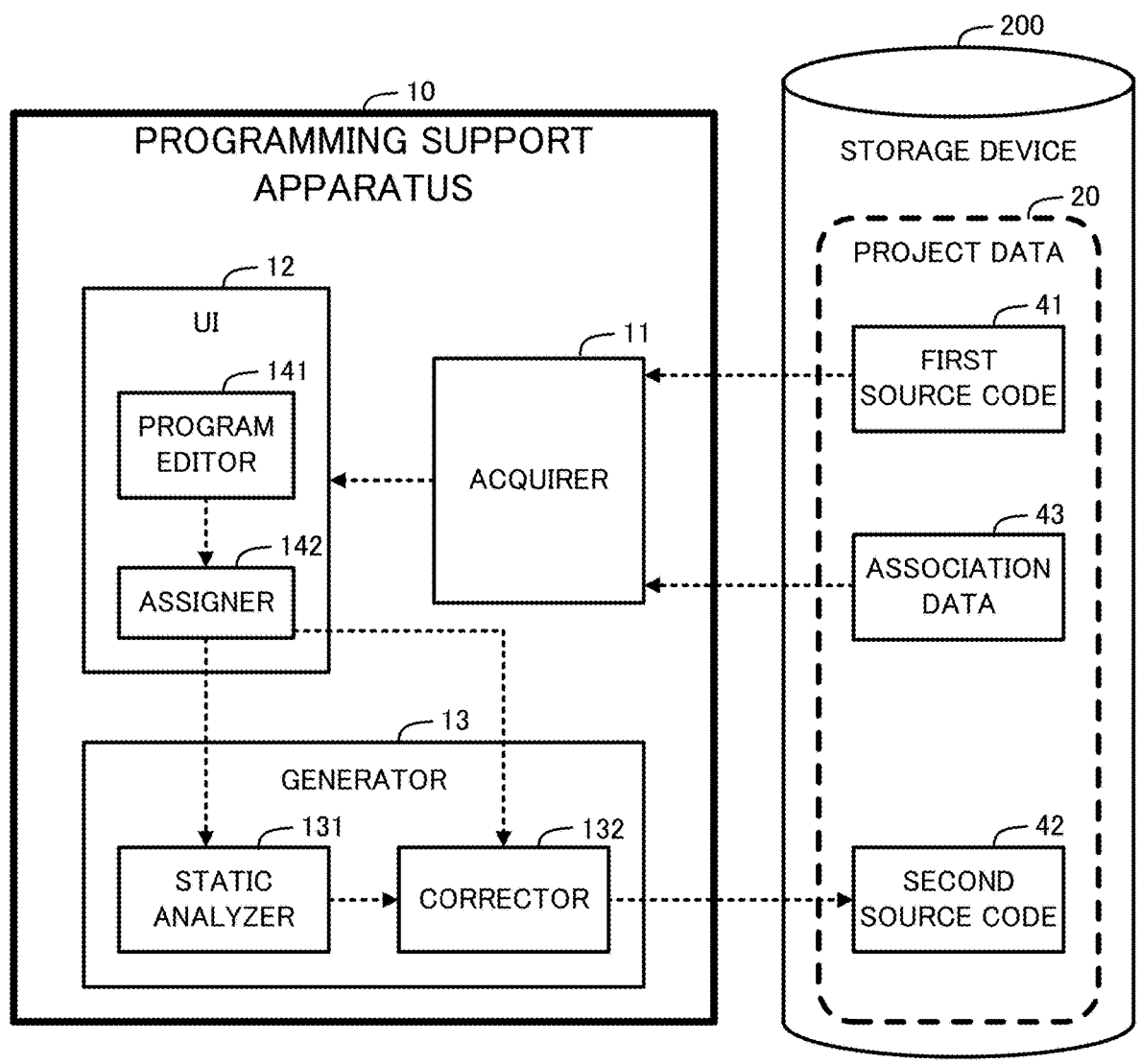
FIG. 8 illustrates a functional configuration of a programming support apparatus according to Embodiment 2.

As illustrated in FIG. 8, the programming support apparatus 10 according to this embodiment reads a non-object-oriented first source code 41 contained in the project data 20 stored in the storage device 200, generates an object-oriented second source code 42 from the read first source code 41, and outputs the generated second source code 42.

The first source code 41 and the second source code 42 both correspond to the execution program 23 in Embodiment 1. The first source code 41 contains descriptions relating to instances of conventional FBs. The descriptions relating to instances may be declarations of instances, or descriptions for accessing logical descriptions or variables of instances. The second source code 42 corresponds to a code generated by replacing descriptions relating to instances of conventional FBs of the first source code 41 with descriptions relating to instances of object-oriented FBs.

The project data 20 contains the association data 43. The association data 43 indicates correspondence relationships between conventional FBs and object-oriented FBs to be used for replacement of descriptions relating to instances. In detail, the association data 43 indicates correspondence relationships between conventional FBs and methods of object-oriented FBs, and correspondence relationships between variables of conventional FBs and a common variable of object-oriented FBs. For example, as illustrated in FIG. 5, the association data 43 indicates the conventional FB 211 and the method 221 in association with each other, the conventional FB 212 and the method 222 in association with each other, and the variables 2111 and 2121 and the common variable 2201 in association with each other.

The association data 43 may be generated by the generator 13 in Embodiment 1, or may be provided from an external apparatus without being generated by the programming support apparatus 10. Although FIG. 8 illustrates the exemplary project data 20 that preliminarily contains the association data 43, the association data 43 may be provided to the programming support apparatus 10 by any procedure. For example, the association data 43 included in an FB library may be imported into the project data 20. Alternatively, the association data 43 may be included in the FBs provided from the manufacturer of FA machines including the programmable controller. The association data 43 corresponds to an example of information that associates the variable contained in the conventional FB, which is the first function block, with the variable contained in the object-oriented FB, which is the second function block.

The acquirer 11 of the programming support apparatus 10 acquires the first source code 41 and the association data 43, and provides the acquired data to the UI 12. The acquirer 11 corresponds to an example of acquisition means, in the programming support apparatus 10, for acquiring association data that associates the function of the first function block with the second function block containing a method indicating the function.

The UI 12 includes a program editor 141 for editing the first source code 41, and an assigner 142 for assigning instances to be replaced.

Figure 9:
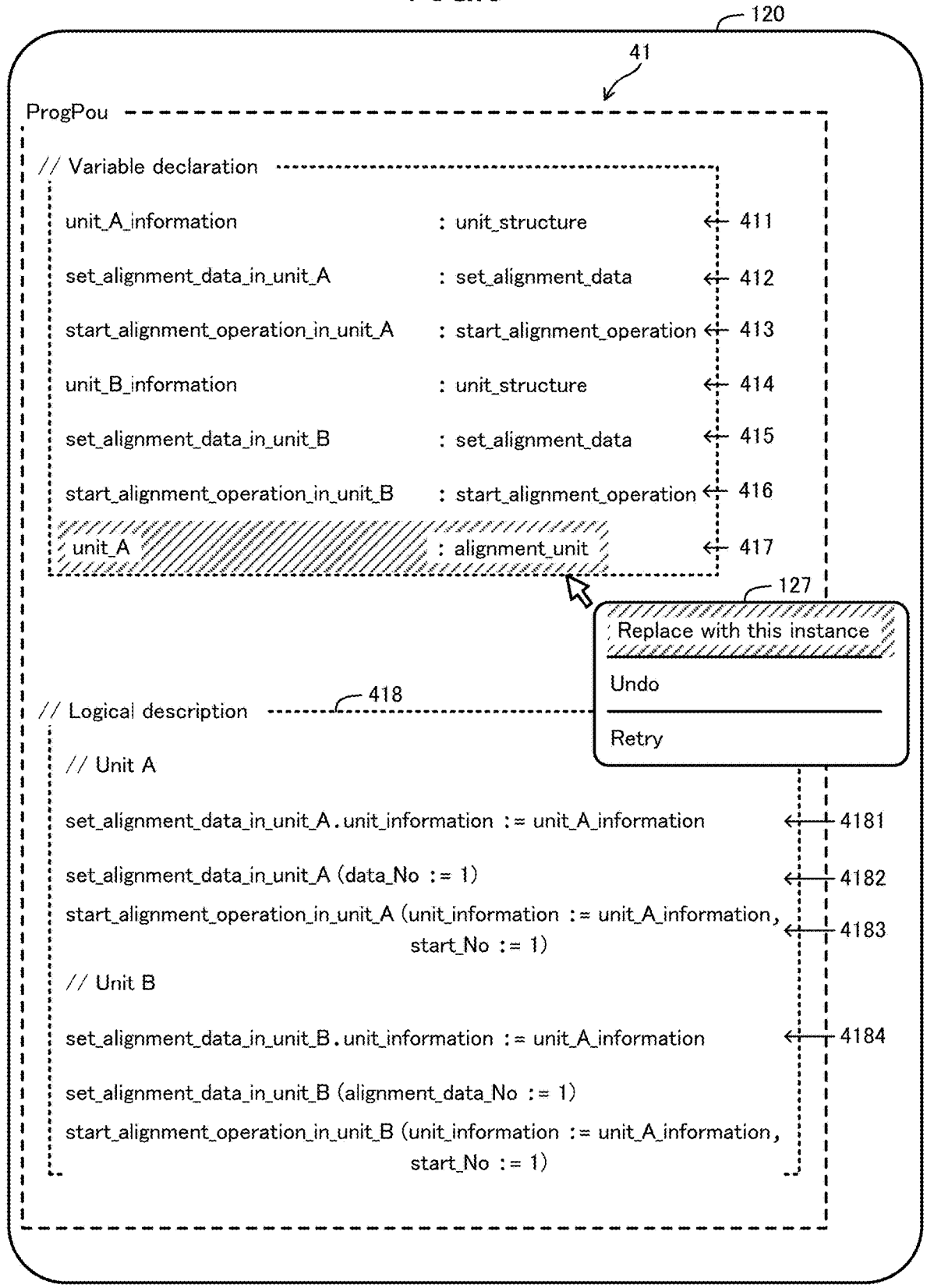
FIG. 9 illustrates an exemplary first source code according to Embodiment 2.

The program editor 141 receives a designation of an instance of an object-oriented FB described in the first source code 41 acquired by the acquirer 11. For example, the program editor 141 causes the screen 120 to display the components of the first source code 41, as illustrated in FIG. 9. The first source code 41 contains variables 411 and 414 substantially common between the conventional FBs 211 and 212, variables 412 and 415 associated with the instances of the conventional FB 211, and variables 413 and 416 associated with the instances of the conventional FB 212. The variables 411 to 413 are related to a "unit A", whereas the variables 414 to 416 are related to a "unit B".

The first source code 41 in the example illustrated in FIG. 9 contains a description relating to declaration of the instance 417 of the object-oriented FB 220. This description relating to the instance 417 is added by the user manipulating the program editor 141, after acquisition of the first source code 41 by the acquirer 11. The description relating to the instance 417 may be preliminarily contained in the first source code 41 stored in the storage device 200. In the case where the description relating to the instance 417 is preliminarily contained in the first source code 41, the UI 12 may exclude the program editor 141. Although FIG. 9 illustrates an exemplary logical description 418 in the form of the structured text prescribed in the IEC standard, the logical description 418 may also be written in another form.

When the user selects the instance 417 in the first source code 41, the program editor 141 causes a submenu 127 containing a list of operations related to this instance 417 to be displayed. When the user designates an action "replace with this instance" in the list of the submenu 127, the program editor 141 receives a designation of the instance 417 of the object-oriented FB to substitute for instances of conventional FBs, and notifies the assigner 142 of the designated instance.

Figure 10:
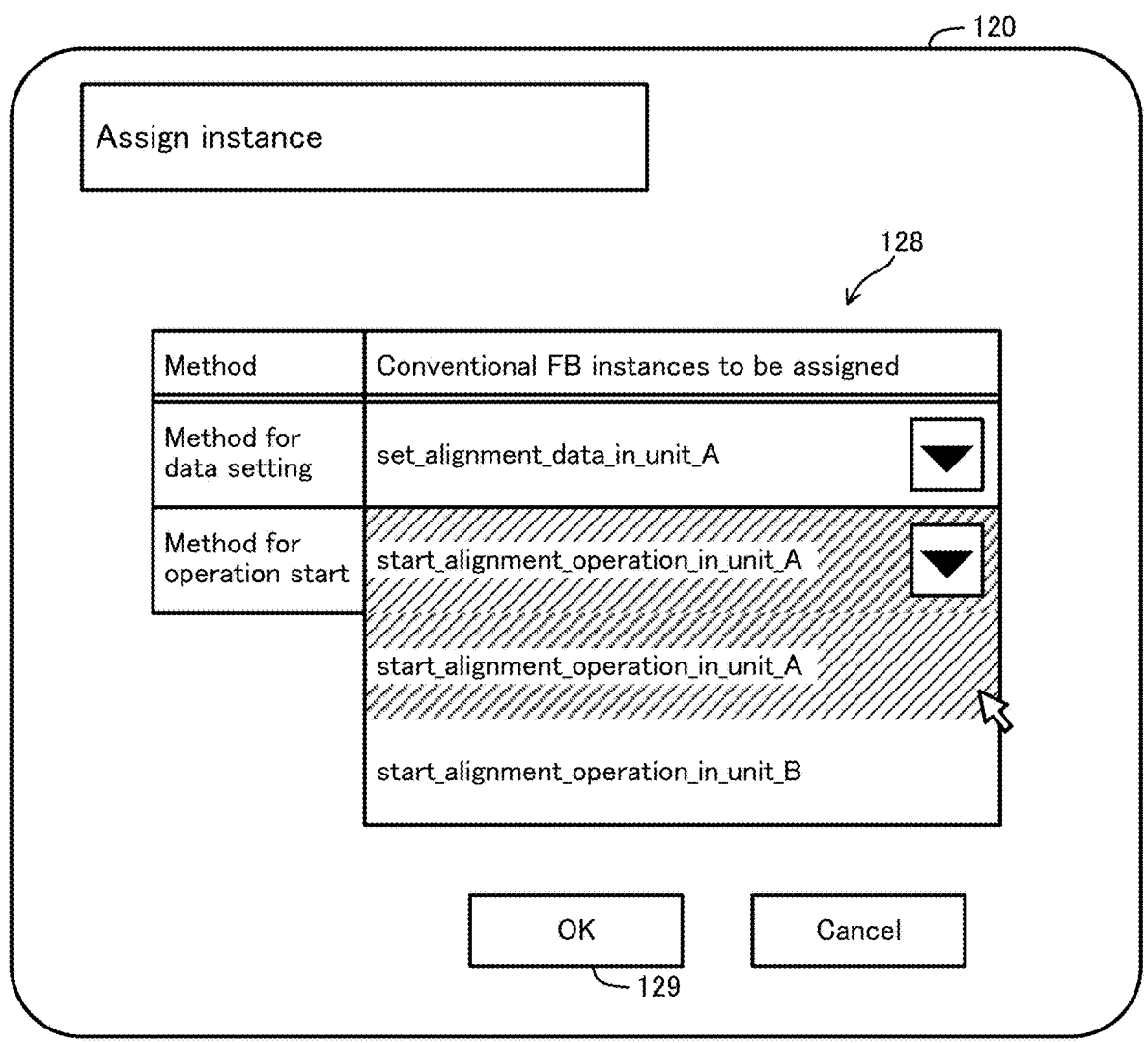
FIG. 10 illustrates an exemplary screen for assignment of instances according to Embodiment 2.

The assigner 142 receives an assignment of instances of conventional FBs to methods of the designated instance of the object-oriented FB. In detail, the assigner 142 receives, from the user, a selection of instances of conventional FBs associated in the association data 43 with methods of the object-oriented FB of the designated instance. For example, as illustrated in FIG. 10, the assigner 142 causes the screen 120 to display a table 128 that illustrates methods and the options of instances of conventional FBs to be assigned to the methods in association with each other. This table 128 allows the user to assign instances of conventional FBs to the methods of the designated instance of the object-oriented FB. The table 128 illustrates candidate instances of conventional FBs to be assigned, which are variables within the scope of the first source code 41 having a data type of the conventional FBs associated with the methods in the association data 43.

For example, as illustrated in FIG. 9, in the case where the instance indicating "alignment_unit" is designated as the substitute instance of the object-oriented FB, the table 128 contains the methods 221 and 222 of the object-oriented FB 220 illustrated in FIG. 5. The instances contained in the table 128 are described in the first source code 41 in the form of the instances of the conventional FBs 211 and 212 associated with the respective methods 221 and 222, as illustrated in FIG. 5. In the example illustrated in FIG. 9, the instances of the conventional FB 211 related to the respective "unit A" and "unit B" are declared as the variables 412 and 415, and the instances of the conventional FB 212 related to the respective "unit A" and "unit B" are declared as the variables 413 and 416, as described above. FIG. 10 illustrates an exemplary combo box containing a list of candidate instances of the conventional FB 212 to be assigned to the "method for operation start". The candidate instances include the instance indicating "start_alignment_operation_in_unit_A" corresponding to the variable 413 and the instance indicating "start_alignment_operation_in_unit_B" corresponding to the variable 416. The instance indicating "start_alignment_operation_in_unit_A" in this list is selected for assignment by the user, as illustrated by hatching. The instance indicating "set_alignment_data_in_unit_A" has already been selected to be assigned to the "method for data setting". When the user presses a button 129, the data designated using the table 128 is provided to the generator 13.

The UI 12 including the program editor 141 and the assigner 142 corresponds to an example of reception means, in the programming support apparatus 10, for receiving a designation of the second instance described in the first source code, and receiving a selection of the instance of the conventional FB having the function associated in the association data with the method of the designated second instance.

The generator 13 includes a static analyzer 131 to statically analyze the first source code 41, and a corrector 132 to correct descriptions relating to instances of conventional FBs described in the first source code 41 into descriptions relating to instances of object-oriented FBs.

The static analyzer 131 determines whether the instances of conventional FBs assigned by the assigner 142 are replaceable with the methods of the object-oriented FB. The static analyzer 131 also determines whether the operations of the programmable controller in accordance with the replacement code, generated by replacing the instances of the conventional FBs described in the first source code 41 with the methods of the object-oriented FB, have any difference from the operations of the programmable controller in accordance with the first source code 41. When the static analyzer 131 determines the instances to be replaceable and detects no difference between the operations, the static analyzer 131 allows the corrector 132 to correct the first source code 41, and thus causes the corrector 132 to generate a second source code 42.

When determining the instances to be unreplaceable, the static analyzer 131 notifies the user that the replacement is unavailable. When detecting any difference between the operations, the static analyzer 131 notifies the user that the replacement will change the operations. These notifications to the user may be provided via the UI 12 or by another procedure. The generator 13 including the static analyzer 131 corresponds to an example of generation means for providing, when an operation of the programmable controller in accordance with a replacement code generated by replacement of replacing the description for calling the function of the first function block in the first source code with the description for calling the method of the second function block has a difference from an operation of the programmable controller in accordance with the first source code, a notification indicating that the replacement changes the operation. The generator 13 also corresponds to an example of generation means for providing, when the association data associates a variable of the first function block describing the first instance in the first source code with a variable of a method contained in the second function block, a notification indicating that the variable of the first instance of the first function block is unreplaceable with the variable of the method contained in the second function block.

The corrector 132 corrects descriptions relating to instances of conventional FBs in the first source code 41 into descriptions relating to instances of object-oriented FBs. The instances of conventional FBs are used to call logical descriptions indicating functions of the conventional FBs, or to access variables of the conventional FBs. The corrector 132 replaces descriptions for calling logical descriptions of the conventional FBs with descriptions for calling methods of object-oriented FBs. The corrector 132 also replaces descriptions for accessing variables of the conventional FBs into descriptions for accessing variables of the object-oriented FBs. The corrector 132 deletes the declarations of the successfully replaced instances of conventional FBs from the first source code 41.

The generator 13 including the corrector 132 corresponds to an example of generation means for replacing a description for calling the function of the first function block in the first source code, with a description for calling the method of the second function block. The generator 13 also corresponds to an example of generation means for replacing a description of a variable contained in the first function block in the first source code, with a description of a variable contained in the second function block.

FIG. 11 illustrates an exemplary second source code 42 generated by the corrector 132 that corrects the first source code 41 illustrated in FIG. 9. As illustrated in FIG. 11, the declarations of the variables 412 and 413 corresponding to the instances of the conventional FB related to the "unit A" have been deleted from the second source code 42. The logical description 418 has been corrected into the logical description 419.

In the case where a parameter designated at calling of a logical description is a common variable, this parameter is deleted from the one or more parameters to be designated at calling of the corresponding method. The corrector 132 thus adds a description for destructuring assignment. In the example illustrated in FIG. 11, a description 4183 indicating "start_alignment_operation_in_unit_A (unit_information: =unit_A_information, start No: =1)" contained in the logical description 418 has been corrected into a description 4193 indicating "unit_A. method_for_operation_start (start_No: =1);", and a description 4192 indicating "unit_A. unit_information: =unit_A_information;" for destructuring assignment has been added. This destructuring assignment has generated substantially the same descriptions 4191 and 4192. Such redundant descriptions may be simplified by the corrector 132 that executes an optimization process.

Figure 12:
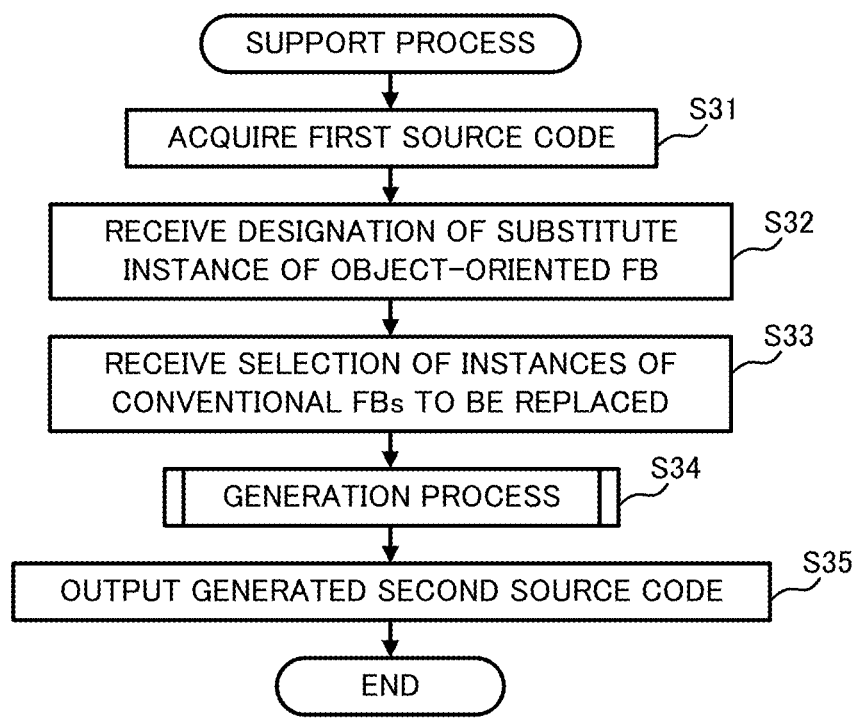
FIG. 12 is a flowchart illustrating a support process according to Embodiment 2.
Figure 13:
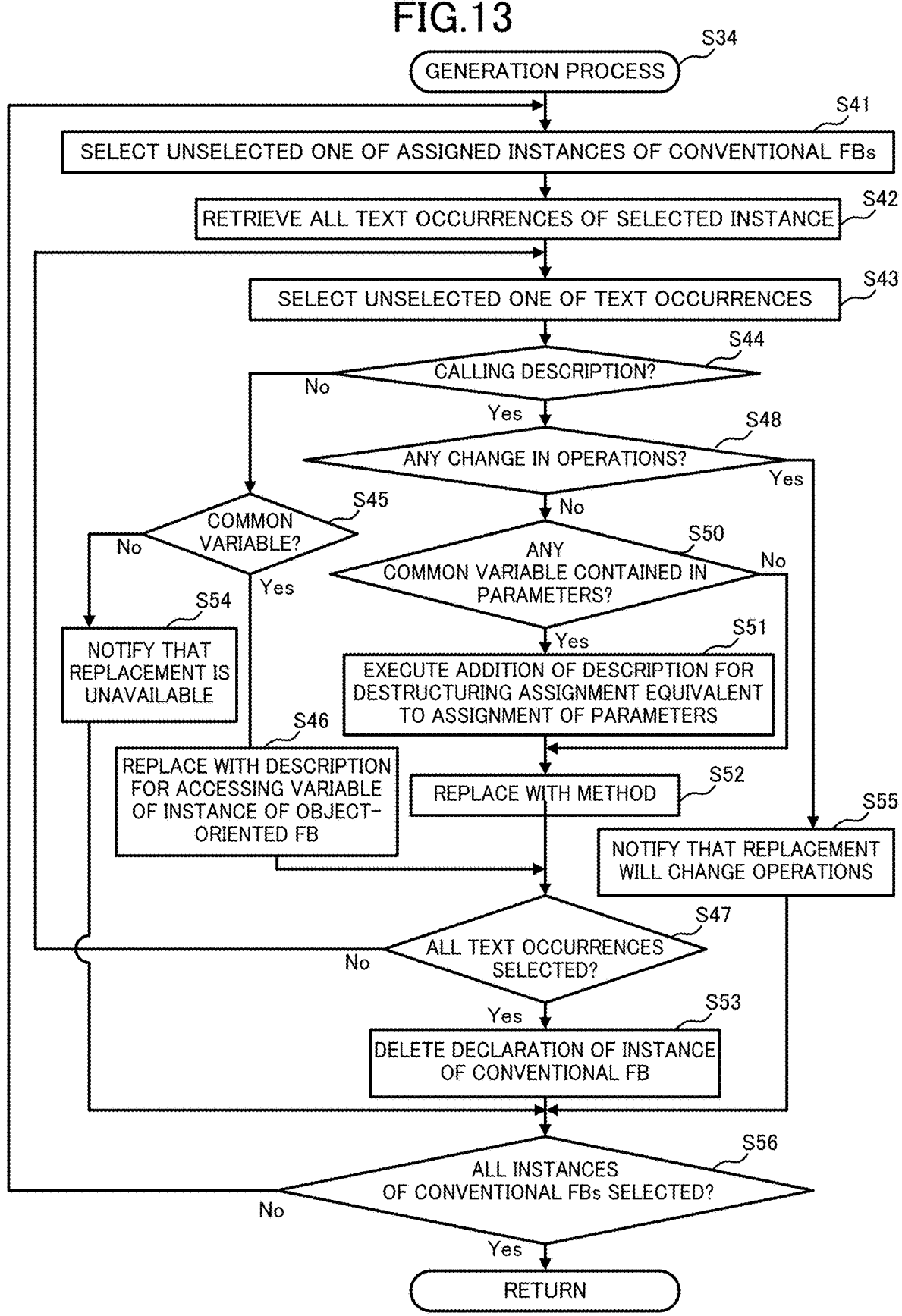
FIG. 13 is a flowchart illustrating a generation process according to Embodiment 2.

The following describes a support process executed by the programming support apparatus 10 according to this embodiment with reference to FIGS. 12 and 13. In the support process illustrated in FIG. 12, the acquirer 11 acquires a first source code 41 (Step S31). The program editor 141 of the UI 12 then receives a designation of a substitute instance of an object-oriented FB (Step S32), and the assigner 142 receives a selection of instances of conventional FBs to be replaced (Step S33).

On the basis of the received designation and selection in Steps S32 and S33, the generator 13 executes a generation process for generating the second source code 42 from the first source code 41 acquired in Step S31 (Step S34). The generator 13 then outputs the generated second source code 42 (Step S35), and then terminates the support process.

FIG. 13 illustrates the details of the generation process in Step S34. In the generation process illustrated in FIG. 13, the generator 13 selects an instance that has not been selected in the generation process, from among the instances of the conventional FBs assigned in Step S33 (Step S41). For example, the generator 13 selects the instance indicating "set_alignment_data_in_unit_A" illustrated in FIG. 10.

The generator 13 then searches for all the text occurrences of the instance selected in Step S41 in the first source code 41 (Step S42). The generator 13 thus retrieves descriptions 4181 and 4182 containing the phrase "set_alignment_data_in_unit_A" in the example illustrated in FIG. 9. The declaration of the variable 412 corresponding to an instance of a conventional FB is excluded from the searching targets.

The static analyzer 131 of the generator 13 then selects one of the retrieved text occurrences that has not been selected in the generation process (Step S43). The static analyzer 131 then determines whether the text occurrence selected in Step S43 is a calling description (Step S44). In specific, the static analyzer 131 determines whether this text occurrence is a description for calling a logical description of an instance of a conventional FB. When the text occurrence selected in Step S43 is the description 4181 illustrated in FIG. 9, the determination in Step S44 provides a negative result because the description 4181 is not a calling description but a description for accessing an instance variable.

When determining that the selected text occurrence is not a calling description (Step S44; No), the static analyzer 131 regards this text occurrence as a description for accessing a variable, and determines whether this variable to be accessed is a common variable (Step S45). For example, the description 4181 illustrated in FIG. 9 contains the variable indicating "unit_information" corresponding to a common variable as illustrated in FIG. 5, resulting in a positive result of the determination in Step S45.

When the variable to be accessed is determined to be a common variable (Step S45; Yes), the corrector 132 replaces the selected text occurrence with a description for accessing a instance variable of the object-oriented FB (Step S46). This step replaces the description 4181 illustrated in FIG. 9 with the description 4191 illustrated in FIG. 11.

The generator 13 then determines whether all the text occurrences have been selected (Step S47). When determining that not all the text occurrences have been selected (Step S47; No), the generator 13 returns to Step S43, and executes the steps for the subsequent text occurrence. The generator 13 thus selects the description 4182 illustrated in FIG. 9, for example.

When determining that the selected text occurrence is a calling description in Step S44 (Step S44; Yes), the static analyzer 131 determines whether replacement of this calling description with a method will change the operations of the programmable controller (Step S48). In an exemplary case where the operations based on the calling description depend on the previous value, the operations in accordance with the replacement code, which is generated by replacing the calling description with a method, differ from the operations in accordance with the first source code 41. The previous value indicates a result of the previous scanning operation by the programmable controller. The scanning operation corresponds to a single execution among the repeated executions of the control process prescribed in the operational program by the programmable controller.

When determining that the replacement will not change the operations (Step S48; No), the static analyzer 131 determines whether the parameters designated in the calling description contain a common variable (Step S50). In specific, the static analyzer 131 determines whether the designated arguments contain a variable associated with the common variable. When the static analyzer 131 determines that the parameters contain a common variable (Step S50; Yes), the addition of a description for destructuring assignment is executed, which is equivalent to the assignment of parameters (Step S51), because simple replacement of a variable of the conventional FBs with a common variable is unavailable. This example assumes that the formal arguments of the destructuring assignment are not descriptions for accessing instance variables of the conventional FBs but descriptions for accessing instance variables of the object-oriented FB.

When the parameters are determined to contain no common variable (Step S50; No), or after Step S51, the corrector 132 replaces the selected description with a method of the object-oriented FB (Step S52). This step replaces the description 4182 illustrated in FIG. 9 with the description 4194 illustrated in FIG. 11. The process then goes to the determination in Step S47.

When all the text occurrences are determined to have been selected in Step S47 (Step S47; Yes), the corrector 132 deletes the declaration of the selected instance (Step S53). This steps deletes the variable 412 illustrated in FIG. 9, for example. The programming support apparatus 10 then completes the steps for the currently selected instance of the conventional FB, and proceeds to Step S56.

When the variable to be accessed is determined to be not a common variable in Step S45 (Step S45; No), the generator 13 determines that this variable is associated with a variable in a method of an instance of the object-oriented FB and thus cannot be accessed from the outside. The generator 13 notifies the user that the descriptions are unreplaceable (Step S54), and proceeds to Step S56 without replacing the currently selected instance of the conventional FB.

When the replacement is determined to change the operations in Step S48 (Step S48; Yes), the generator 13 notifies the user that the replacement will change the operations (Step S55), and proceeds to Step S56 without replacing the currently selected instance of the conventional FB.

That is, when all the text occurrences of the instance selected in Step S41 retrieved in Step S42 are correctable, the deletion in Step S53 is executed to complete the replacement of instances. In contrast, when any uncorrectable text occurrence is detected, the steps for the selected instance are terminated.

In Step S56, the generator 13 determines whether all the instances of the conventional FBs selected in Step S33 have been selected in the generation process (Step S56). When determining that not all the instances have been selected (Step S56; No), the generator 13 repeats Step S41 and the following steps. The generator 13 thus selects the instance indicating "start_alignment_operation_in_unit_A" of the conventional FB 212 as illustrated in FIG. 10, and then executes Steps S50 to S52. The description 4183 illustrated in FIG. 9 is thus replaced with the descriptions 4192 and 4193 illustrated in FIG. 11.

In contrast, when all the instances are determined to have been selected (Step S56; Yes), the process executed by the programming support apparatus 10 returns from the generation process to the support process illustrated in FIG. 12.

As described above, the programming support apparatus 10 according to this embodiment replaces descriptions relating to instances of conventional non-object-oriented FBs contained in the first source code 41 with descriptions relating to instances of object-oriented FBs, and thus generates a second source code 42. The programming support apparatus 10 can therefore reduce the burden on the user who generates operational programs for programmable controllers, and promote transition to object-oriented programming.

Although the user selects multiple instances in the example illustrated in FIG. 10, this configuration is a mere example. The programming support apparatus 10 may assign a single instance of a conventional FB to a method in response to a selection of the instance of the conventional FB by the user, for example. The programming support apparatus 10 in this case analyzes the first source code 41, and detects another instance containing data connected to the variable common to the instance first selected by the user.

Embodiment 3

The following describes Embodiment 3, focusing on the differences from Embodiments 1 and 2 described above. The components identical or corresponding to those in Embodiments 1 and 2 are provided with the same reference symbols, without redundant description or with simplified description. This embodiment is based on a combination of Embodiments 1 and 2, but differs from Embodiment 1 in that the programming support apparatus 10 generates the second source code 42 from the first source code 41 without a user manipulation for selecting subjects to be replaced.

Figure 14:
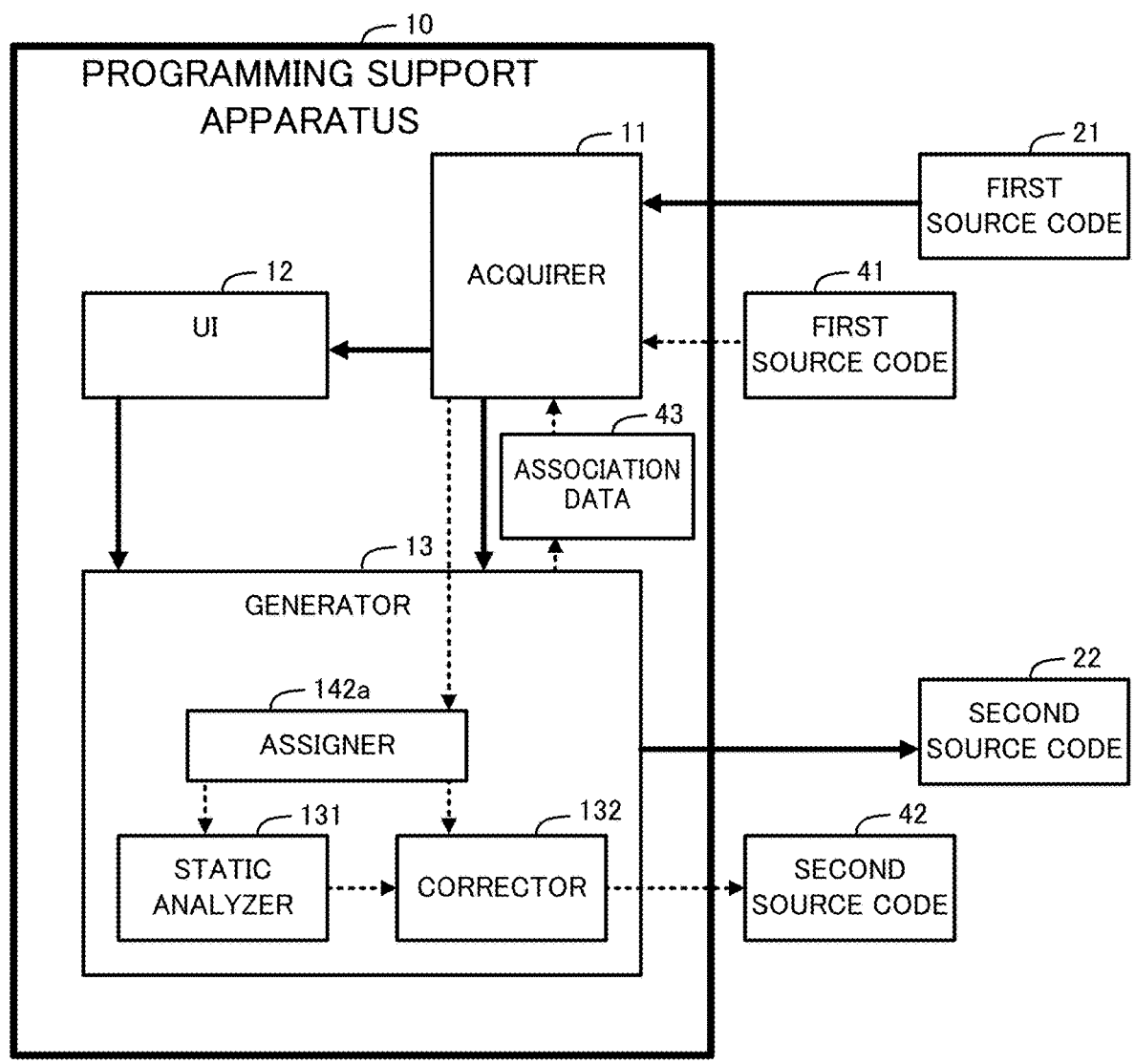
FIG. 14 illustrates a functional configuration of a programming support apparatus according to Embodiment 3.

As illustrated in FIG. 14, the programming support apparatus 10 according to this embodiment includes the acquirer 11, the UI 12, and the generator 13 that operate as in Embodiment 1. FIG. 14 illustrates the flows of information identical to those in Embodiment 1 with thick solid arrows.

The generator 13 generates association data 43, and the acquirer 11 acquires the association data 43. The association data 43 is processed as inside information in the programming support apparatus 10 and does not need to be perpetuated in the outside. The acquirer 11 and the generator 13 perform the same functions as those in Embodiment 2. The UI 12 excludes the program editor 141 and the assigner 142 in Embodiment 2.

The generator 13 includes an assigner 142a having functions extended from those of the assigner 142 in Embodiment 2. The assigner 142a is provided with the association data 43 and the project data 20 from the acquirer 11.

The assigner 142a extracts, from the project data 20, one or more first source codes 41 containing instances of conventional FBs, declares instances of object-oriented FBs for the individual extracted first source codes 41, and assigns instances of conventional FBs to the instances of the object-oriented FBs.

Figure 15:
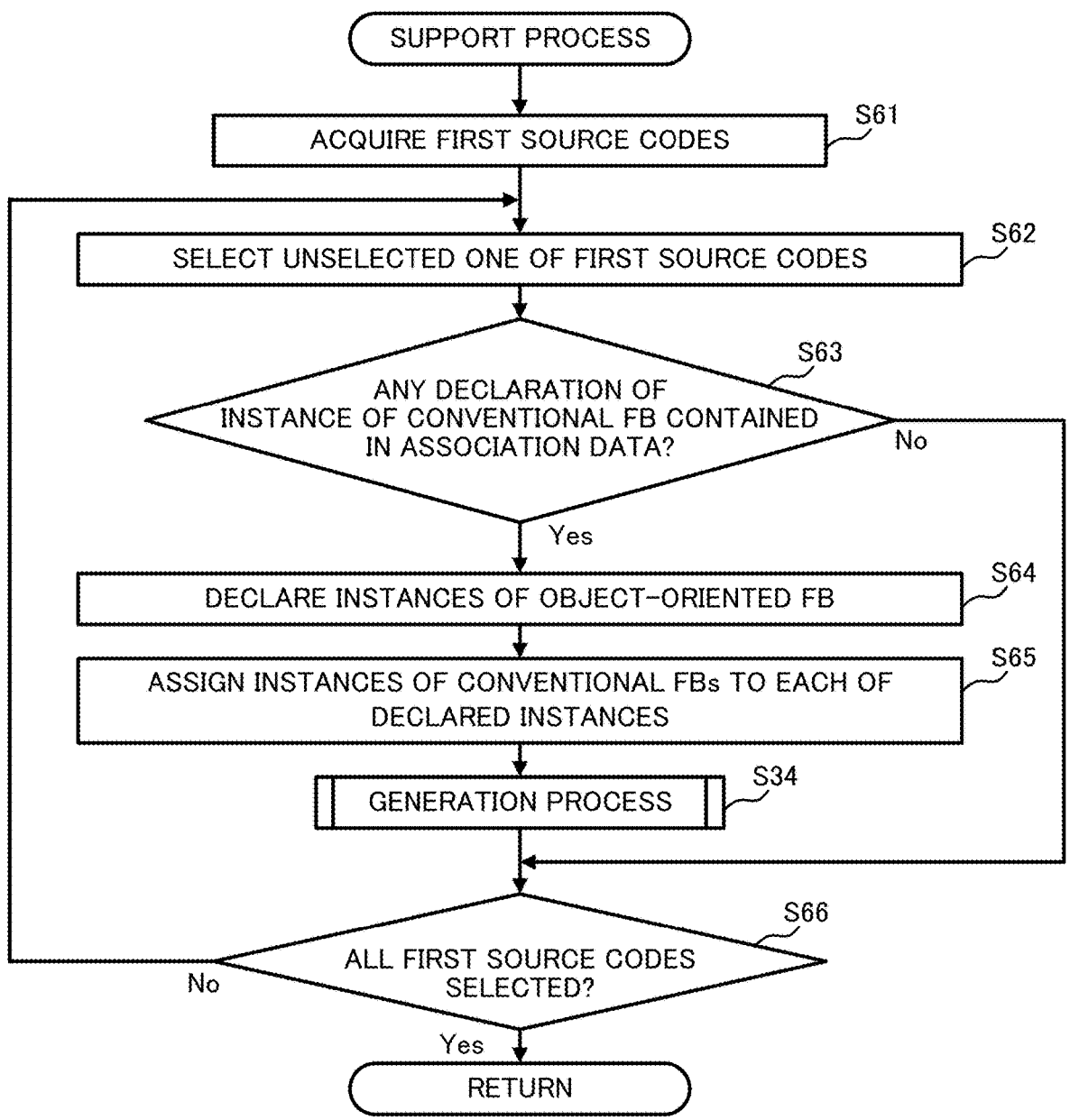
FIG. 15 is a flowchart illustrating a support process according to Embodiment 3.

The following describes a support process executed by the programming support apparatus 10, focusing on the steps executed by the assigner 142a. In the support process illustrated in FIG. 15, the acquirer 11 acquires multiple first source codes 41 (Step S61).

The assigner 142a then selects an unselected one of the first source codes 41 (Step S62). The assigner 142a then determines whether the selected first source code 41 contains declarations of instances of the conventional FBs contained in the association data 43 (Step S63). That is, the assigner 142a determines whether the first source code 41 contains declarations of instances replaceable on the basis of the association data 43. When determining that the first source code 41 contains no declaration of such an instance (Step S63; No), the assigner 142a terminates the steps for this first source code 41 and proceeds to Step S66.

In contrast, when determining that the first source code 41 contains declarations of such instances (Step S63; Yes), the assigner 142a declares instances of the object-oriented FB associated in the association data 43 with the conventional FBs of the instances found in Step S63, in the selected first source code 41 (Step S64). This Step S64 provides the declaration of the instance 417 illustrated in FIG. 9. The declaration of instances is executed by the programming support apparatus 10 in Step S64, in contrast to the declaration of the instance 417 illustrated in FIG. 9 added outside the programming support apparatus 10.

In specific, the assigner 142a classifies the instances of conventional FBs declared in the first source code 41 into groups, and declares instances of object-oriented FBs for the individual groups. The instances of the conventional FBs are classified while preventing multiple instances declared on the basis of the identical conventional FB from belonging to the same group. That is, after every declaration of an instance based on the identical conventional FB, the declared instance is classified into a new group. The instances of the conventional FBs may also be classified while preventing the instance variables of multiple conventional FBs belonging to the same group from corresponding to common variables having different data types, on the basis of analysis of the first source codes 41. The number of groups is minimized, so that a larger number of instances of conventional FBs can be assigned to a single instance of an object-oriented FB.

The assigner 142a then assigns, to each of the instances of object-oriented FBs declared in Step S64, the instances of the conventional FBs classified into the group associated with this object-oriented FB (Step S65). This Step S65 corresponds to the assignment of instances to the method as illustrated in FIG. 10. The assignment is executed by the programming support apparatus 10 in Step S65, in contrast to the assignment executed by the user in the example illustrated in FIG. 10.

The generator 13 then executes the generation process as that in Embodiment 2 (Step S34). The generator 13 then determines whether all the first source codes 41 have been selected (Step S66). When determining that not all the first source codes 41 have been selected (Step S66; No), the generator 13 repeats Step S62 and the following steps. In contrast, when determining that all the first source codes 41 have been selected (Step S66; Yes), the generator 13 terminates the support process.

As described above, the assigner 142a analyzes the first source codes 41, and assigns instances of conventional FBs to methods of instances of object-oriented FBs. This configuration can further reduce the burden on the user who generates operational programs. The generator 13 including the assigner 142a corresponds to an example of generation means for classifying first instances described in the first source code into groups, and replacing, for each of the groups, a description relating to the first instance belonging to the group with a description relating to the second instance of the second function block corresponding to the group, the second function block containing the method associated in the association data with the first function block describing the first instance.

The above-described embodiments are not to be construed as limiting the scope of the present disclosure.

For example, although the second source codes 22 and 42 are output to the project data 20 stored in the storage device 200 in the above-described embodiment, this configuration is a mere example. For example, the second source codes 22 and 42 may also be output as the components of new project data other than the project data 20.

Each of the first source code 21 and 41 and the second source codes 22 and 42 may contain a single file or multiple files. The single file may be divided and deemed as separate first source codes 41.

Figure 16:
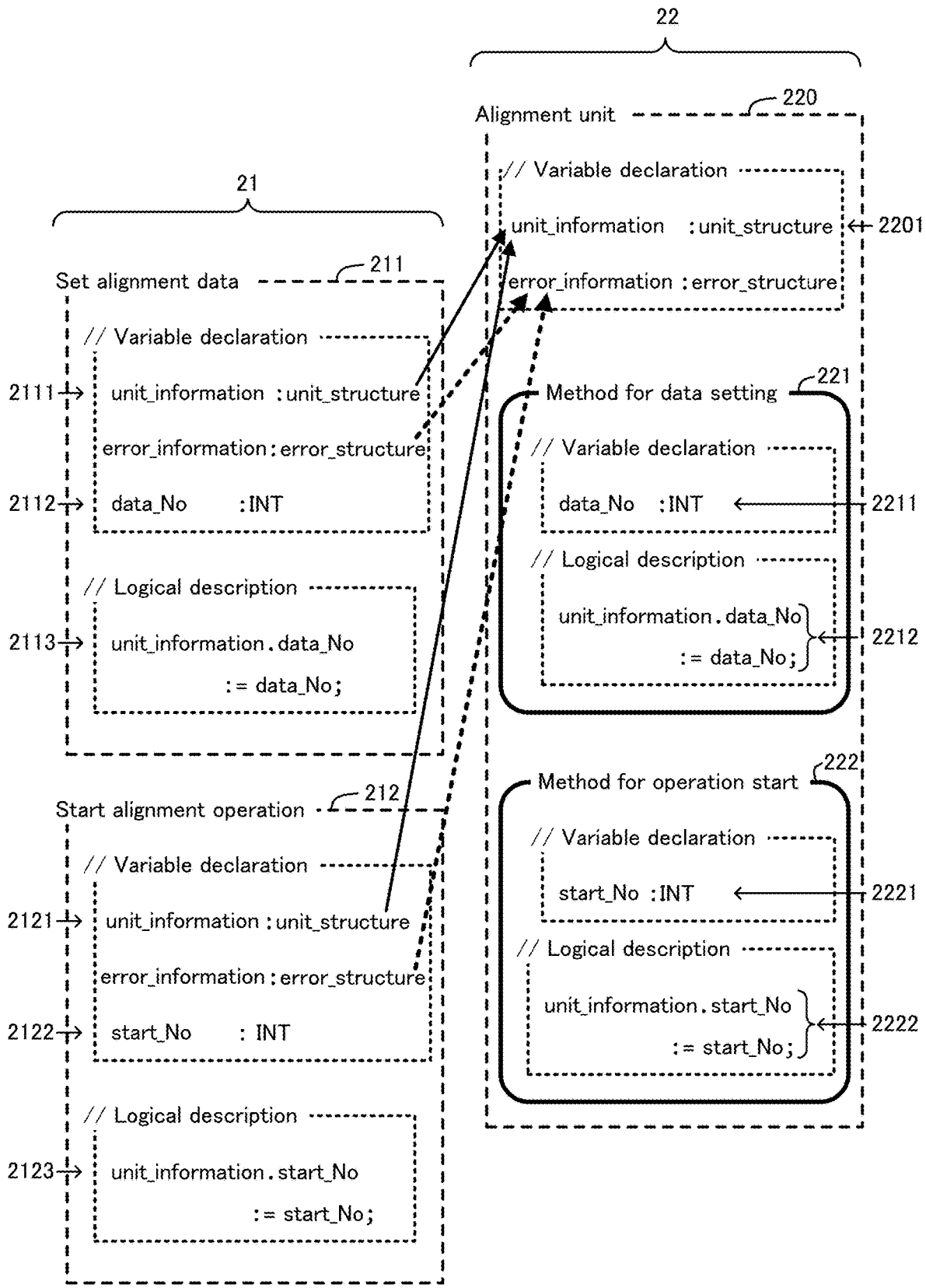
FIG. 16 illustrates a comparison between a first source code and a second source code according to a modification.

Although only a single common variable in object-oriented FBs is determined in the above-described embodiments, this configuration is a mere example. Alternatively, as in the example illustrated in FIG. 16, the variables indicating "unit_information" contained in both of the conventional FBs 211 and 212 may be associated with the common variable indicating "unit_information" in the object-oriented FB 220, whereas the variables indicating "error_information" contained in both of the conventional FBs 211 and 212 may be associated with the common variable indicating "error_information" in the object-oriented FB 220. Such correspondence relationships are determined by the user using the names of the common variables, as illustrated in FIG. 17.

The functions of the programming support apparatus 10 may be achieved by dedicated hardware or an ordinal computer system.

For example, the program P1 to be executed by the processor 31 may be stored into a non-transitory computer-readable recording medium and distributed. The program P1 when being installed in a computer can configure a device for executing the above-described processes. Examples of such a non-transitory recording medium include flexile disk, compact disc read-only memory (CD-ROM), digital versatile disc (DVD), and magneto-optical disc (MO).

The program P1 may also be stored in a disk drive included in a server device on a communication network represented by the Internet, and may be downloaded into a computer by being superimposed on a carrier wave, for example.

Alternatively, the program P1 may be activated while being transferred through a communication network, to execute the above-described processes.

A server device may execute all or part of the program P1, and a computer may execute the program while transmitting and receiving information on the executed processes to and from the server device via a communication network, to execute the above-described processes.

In the case where the above-described functions are shared by an operating system (OS) or achieved by cooperation of the OS and applications, only the components other than the OS may be stored into a non-transitory medium and distributed, or downloaded into a computer.

The functions of the programming support apparatus 10 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for development of operational programs for operating programmable controllers.

REFERENCE SIGNS LIST

10 Programming support apparatus
11 Acquirer
12 UI
120 Screen
121, 127 Submenu
122 Entry field
123, 128 Table
124 Checkbox column
125 Column
126, 129 Button
13 Generator
131 Static analyzer
132 Corrector
141 Program editor
142, 142a Assigner
200 Storage device
20 Project data
21, 41 First source code
211, 212, 213 Conventional FB
2111, 2112, 2121, 2122, 411, 412, 413, 414, 415, 416 Variable
22, 42 Second source code
220 Object-oriented FB
2201 Common variable
221, 222 Method
23 Execution program
31 Processor
32 Main storage
33 Auxiliary storage
34 Inputter
35 Outputter
36 Communicator
37 Internal bus
43 Association data
418, 419, 2113, 2212, 2222, 4181 to 4184, 4191 to 4194 Description
417 Instance
P1 Program

The invention claimed is:

1. A non-transitory computer-readable recording medium storing a programming support program for a computer that provides support for generation of an operational program for operating a programmable controller, the programming support program causing the computer to:

acquire a first source code of the operational program, wherein the first source code contains definitions of first function blocks corresponding to non-object-oriented subroutines;

receive a user selection of function blocks among the first function blocks of the first source code;

receive a user selection of variables to be integrated into a common variable among variables of the selected function blocks; and generate a second source code of the operational program by replacing a plurality of first function blocks of the first function blocks described in the first source code with a second function block, the second function block describing the function as a plurality of methods, wherein the second source code contains definitions of object-oriented function blocks, the generation of the second source code includes:
receiving relationship information indicating a relationship between the variable of each of the plurality of first function blocks to be integrated into the common variable and a variable of the second function block that is the common variable, and generating the second source code based on the relationship information by replacing the plurality of first function blocks selected from the first source code with the second function block containing the methods corresponding to the plurality of first function blocks.

2. The non-transitory computer-readable recording medium according to claim 1, wherein the generation of the second source code includes replacing the plurality of first function blocks with the second function block containing the common variable corresponding to different variables that are each contained in a corresponding first function block of the plurality of first function blocks.

3. The non-transitory computer-readable recording medium according to claim 1, wherein the generation of the second source code further includes, after receiving a user input, generating an empty object-oriented function block and registers the common variable in the generated empty object-oriented function block.

4. The non-transitory computer-readable recording medium according to claim 1, wherein
the relationship information indicates, as the variable to be integrated into the common variable, a variable designated through selection by a user or automatic detection of variables connected to same data in the first source code, and a name of the common variable is set by user input or in accordance with predetermined naming rules.

5. The non-transitory computer-readable recording medium according to claim 1, wherein
the relationship information indicates the relationship between the plurality of first function blocks and the methods of the second function block and a relationship between a variable of each of the plurality of first function blocks and a variable of the second function block, and the generator generates the second function block based on the relationship information.

6. The non-transitory computer-readable recording medium according to claim 1, wherein the generation of the second source code includes receiving, as the relationship information, a user selection of the variable to be integrated into the common variable by the user entering a name of the common variable to be generated by integration in the second function block.

7. The non-transitory computer-readable recording medium according to claim 1, wherein the generation of the second source code further includes:
displaying a user interface having a table including:
a first column including a name of the function blocks;
a second column including a variable name of the function blocks;
a third column including a data type of the function blocks;
a fourth column including a class of the function blocks;
a fifth including a check box for integrating the function blocks into the common variable; and
a sixth column indicating a name of the common variable; and receiving, as the relationship information, a user selection of the variable to be integrated into the common variable by the user checking a corresponding checkbox and then entering a name of the common variable to be generated by integration in the second function block.

8. The non-transitory computer-readable recording medium according to claim 1, wherein the generation of the second source code further includes:
generating an empty object-oriented function block, and registering the common variable to the generated empty object-oriented function block;
selecting a function block that has not been selected in the generation process, from among the selected function blocks;
generating an empty method and adding a logical description of the function block selected, in the form of a logical description of the empty method generated;
selecting a variable that has not been selected in the generation process, from among the variables contained in the function block selected;
determining whether the selected variable corresponds to the common variable;
in response to the selected variable corresponds to the common variable, determining whether a name of the selected variable is identical to a name of the common variable; and
in response to the name of the selected variable being different from the name of the common variable, replacing the name of the selected variable with the name of the common variable.

9. A programming support apparatus that provides support for generation of an operational program for operating a programmable controller, the programming support apparatus comprising:
processing circuitry to
acquire a first source code of the operational program, wherein the first source code contains definitions of first function blocks corresponding to non-object-oriented subroutines,
receive a user selection of function blocks among the first function blocks of the first source code;
receive a user selection of variables to be integrated into a common variable among variables of the selected function blocks; and
generate a second source code of the operational program by replacing a plurality of first function blocks of the first function blocks described in the first source code with a second function block, the second function block describing the function as a plurality of methods, wherein the second source code contains definitions of object-oriented function blocks, the processing circuitry receives relationship information indicating a relationship between the variable of each of the plurality of first function blocks to be integrated into the common variable and a common variable of the second function block that is the common variable, and the processing circuitry generates the second source code based on the relationship information by replacing the plurality of first function block selected from the first source code with the second function block containing the methods corresponding to the plurality of first function blocks.

10. The programming support apparatus according to claim 9, wherein the processing circuitry further, after receiving a user input, generates an empty object-oriented function block and registers the common variable in the generated empty object-oriented function block.

11. A non-transitory computer-readable recording medium storing a programming support program for a computer that provides support for generation of an operational program for operating a programmable controller, the programming support program causing the computer to:

acquire a first source code of the operational program, wherein the first source code contains definitions of first function blocks corresponding to non-object-oriented subroutines;

receive a user selection of function blocks among the first function blocks of the first source code;

receive a user selection of variables to be integrated into a common variable among variables of the selected function blocks; and receive relationship information indicating a relationship between the plurality of first function blocks and a second function block and a relationship between the variable of each of the plurality of first function blocks to be integrated into the common variable and a variable of the second function block that is the common variable and to generate a second source code of the operational program based on the relationship information by replacing a description relating to first instances declared based on the plurality of first function blocks in the first source code, with a description relating to a second instance declared based on the second function block, the second function block describing the function as a plurality of methods, wherein the second source code contains definitions of object-oriented function blocks.

12. The recording medium according to claim 11, wherein the programming support program further causes the computer to function as a receiver to receive a selection of the first instances, the acquirer acquires association data that associates functions of the first function blocks with the second function block containing the methods indicating functions, the receiver receives a designation of the second instance described in the first source code, and receives a selection of the first instances of the first function blocks having the functions associated in the association data with the methods of the designated second instance, and the generator replaces the description relating to the selected first instances with the description relating to the second instance.

13. The recording medium according to claim 12, wherein the generator replaces a description for calling the function of the first function blocks in the first source code, with a description for calling the methods of the second function block.

14. The recording medium according to claim 13, wherein, when an operation of the programmable controller in accordance with a replacement code generated by replacement has a difference from an operation of the programmable controller in accordance with the first source code, the generator provides a notification indicating that the replacement changes the operation, the replacement being replacing the description for calling the function of the first function blocks in the first source code with the description for calling the method of the second function block.

15. The recording medium according to claim 12, wherein the generator replaces a description of a variable contained in the first function blocks in the first source code, with a description of a variable contained in the second function block.

16. The recording medium according to claim 12, wherein
the association data is information that associates the variables contained in the first function blocks with the variable contained in the second function block, and
when the association data associates variables of the first function blocks describing the first instance with a variable of the method contained in the second function block, the generator provides a notification indicating that the variable of the first instance of the first function blocks is unreplaceable with the variable of the method contained in the second function block.

17. The recording medium according to claim 11, wherein
the acquirer acquires association data that associates functions of the first function blocks with the second function block containing the methods indicating the function, and
the generator generates the second source code by
classifying a plurality of the first instances described in the first source code into groups, and
replacing, for each of the groups, at least one description relating to the first instances belonging to the group with a description relating to the second instance of the second function block corresponding to the group, the second function block containing the methods associated in the association data with the first function blocks describing the first instances.

18. The recording medium according to claim 11, wherein the generator further, after receiving a user input, generates an empty object-oriented function block and registers the common variable in the generated empty object-oriented function block.

19. The recording medium according to claim 11, wherein the generator receives, as the relationship information, a user input of the common variable.

20. A programming support apparatus that provides support for generation of an operational program for operating a programmable controller, the programming support apparatus comprising:
processing circuitry to
acquire a first source code of the operational program, wherein the first source code contains definitions of first function blocks corresponding to non-object-oriented subroutines, receive a user selection of function blocks among the first function blocks of the first source code, receive a user selection of variables to be integrated into a common variable among variables of the selected function blocks, receive relationship information indicating a relationship between a plurality of first function blocks of the first function blocks and a second function block and a relationship between the variable of each of the plurality of first function blocks to be integrated into the common variable and a variable of the second function block that is the common variable, and generate a second source code of the operational program based on the relationship information by replacing a description relating to a first instance declared based on the plurality of first function blocks in the first source code, with a description relating to a second instance declared based on the second function block, the second function block describing the function as a plurality of methods, wherein the second source code contains definitions of object-oriented function blocks.

21. The programming support apparatus of claim 20, wherein the processing circuitry further, after receiving a user input, generates an empty object-oriented function block and registers the common variable in the generated empty object-oriented function block.

\* \* \* \* \*